(12) United States Patent
McCool et al.

(10) Patent No.: US 11,052,778 B2
(45) Date of Patent: *Jul. 6, 2021

(54) SYSTEMS AND MOBILE APPLICATION FOR ELECTRIC WIRELESS CHARGING STATIONS

(71) Applicant: HEVO Inc., Brooklyn, NY (US)

(72) Inventors: Jeremy Ryan McCool, New York, NY (US); Steven Clark Monks, New York, NY (US)

(73) Assignee: HEVO INC., Brooklyn, NY (US)

( * ) Notice: Subject to any disclaimer, the term of this patent is extended or adjusted under 35 U.S.C. 154(b) by 593 days.

This patent is subject to a terminal disclaimer.

(21) Appl. No.: 15/722,598

(22) Filed: Oct. 2, 2017

(65) Prior Publication Data

US 2018/0272874 A1    Sep. 27, 2018

Related U.S. Application Data

(63) Continuation of application No. 13/849,904, filed on Mar. 25, 2013, now Pat. No. 9,796,280.
(Continued)

(51) Int. Cl.
*B60L 11/18* (2006.01)
*H02J 50/60* (2016.01)
(Continued)

(52) U.S. Cl.
CPC .......... *B60L 53/305* (2019.02); *B60L 11/182* (2013.01); *B60L 53/12* (2019.02); *B60L 53/36* (2019.02);
(Continued)

(58) Field of Classification Search
CPC ............... B60L 11/182; B60L 11/1824; B60L 11/1833; B60L 11/1846; B60L 11/1861;
(Continued)

(56) References Cited

U.S. PATENT DOCUMENTS 3,801,022 A   4/1974 Cassey et al.
5,264,776 A   11/1993 Hulsey et al.
(Continued)

FOREIGN PATENT DOCUMENTS

| EP | 2985876 | 2/2016 |
|---|---|---|
| WO | 2011049352 | 4/2011 |
| WO | 2018076016 | 4/2018 |

OTHER PUBLICATIONS

U.S. Appl. No. 15/331,274, Non-Final Office Action dated Apr. 6, 2018, 10 pages.
(Continued)

*Primary Examiner* — Richard Isla
*Assistant Examiner* — Dung V Bui
(74) *Attorney, Agent, or Firm* — Bookoff McAndrews, PLLC

(57) ABSTRACT

Provided are a wireless charging system and methodology including a charging station, an application, and a server configured and operating to facilitate wireless vehicle charging. The charging station includes a charging unit for transferring power, a control unit, and a communication unit. The application is accessible through a mobile device and capable of communicating with the charging station. The server is capable of communicating with the charging station and the mobile device.

20 Claims, 22 Drawing Sheets

Related U.S. Application Data

(60) Provisional application No. 61/794,237, filed on Mar. 15, 2013, provisional application No. 61/614,604, filed on Mar. 23, 2012.

(51) Int. Cl.
- *H02J 7/02* (2016.01)
- *H02J 50/12* (2016.01)
- *H02J 5/00* (2016.01)
- *B60L 53/30* (2019.01)
- *B60L 53/36* (2019.01)
- *B60L 53/12* (2019.01)
- *B60L 53/65* (2019.01)

(52) U.S. Cl.
CPC .............. *B60L 53/65* (2019.02); *H02J 7/02* (2013.01); *H02J 50/12* (2016.02); *H02J 50/60* (2016.02); *B60L 2210/10* (2013.01); *B60L 2210/30* (2013.01); *B60L 2210/40* (2013.01); *B60L 2240/545* (2013.01); *B60L 2240/547* (2013.01); *B60L 2240/549* (2013.01); *B60L 2240/622* (2013.01); *B60L 2240/70* (2013.01); *B60L 2250/10* (2013.01); *B60L 2250/12* (2013.01); *B60L 2250/16* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01); *Y02T 90/167* (2013.01); *Y04S 30/12* (2013.01); *Y04S 30/14* (2013.01)

(58) Field of Classification Search
CPC ............. B60L 2210/10; B60L 2210/40; B60L 2210/30; B60L 2240/547; B60L 2240/549; B60L 2240/70; B60L 2240/622; B60L 2250/10; B60L 2250/12; B60L 2250/16; Y02T 10/7005; Y02T 10/705; Y02T 10/7044; Y02T 10/7072; Y02T 10/7216; Y02T 10/7241; Y02T 10/7291; Y02T 90/121; Y02T 90/122; Y02T 90/125; Y02T 90/127; Y02T 90/128; Y02T 90/14; Y02T 90/162; Y02T 90/16; Y02T 90/163; Y02T 90/169; Y02T 90/168; Y04S 30/12; Y04S 30/14; H02J 7/025; H02J 5/005
USPC ...................................................... 320/108
See application file for complete search history.

(56) References Cited

U.S. PATENT DOCUMENTS

| | | | |
|---|---|---|---|
| 5,311,973 | A | 5/1994 | Tseng et al. |
| 5,323,099 | A | 6/1994 | Biasotti et al. |
| 5,327,065 | A | 7/1994 | Bruni et al. |
| 5,461,299 | A | 10/1995 | Bruni |
| 5,463,303 | A | 10/1995 | Hall et al. |
| 5,483,143 | A | 1/1996 | Quon et al. |
| 5,498,948 | A | 3/1996 | Davenport et al. |
| 5,506,489 | A | 4/1996 | Abbott et al. |
| 5,600,222 | A | 2/1997 | Woody et al. |
| 5,606,237 | A | 2/1997 | Biasotti et al. |
| 5,646,500 | A | 7/1997 | Wilson et al. |
| 5,654,621 | A | 8/1997 | Seelig et al. |
| 5,703,462 | A | 12/1997 | Woody et al. |
| 5,831,413 | A | 11/1998 | Gould et al. |
| 5,850,135 | A | 12/1998 | Miyazaki et al. |
| 6,157,162 | A | 12/2000 | Hayashi et al. |
| 6,397,990 | B1 | 6/2002 | Brien et al. |
| 6,879,889 | B2 | 4/2005 | Ross et al. |
| 7,741,734 | B2 | 6/2010 | Joannopoulos et al. |
| 7,825,543 | B2 | 11/2010 | Fisher et al. |
| 7,880,337 | B2 | 2/2011 | Farkas |
| D636,333 | S | 4/2011 | Kulikowski et al. |
| 8,022,576 | B2 | 9/2011 | Joannopoulos et al. |
| 8,035,255 | B2 | 10/2011 | Hall et al. |
| 8,054,036 | B2 | 11/2011 | Onishi et al. |
| 8,072,182 | B2 | 12/2011 | Vasilantone et al. |
| 8,076,800 | B2 | 12/2011 | Joannopoulos et al. |
| 8,076,801 | B2 | 12/2011 | Karalis et al. |
| 8,084,889 | B2 | 12/2011 | Joannopoulos et al. |
| 8,097,983 | B2 | 1/2012 | Fisher et al. |
| 8,106,539 | B2 | 1/2012 | Schatz et al. |
| 8,115,448 | B2 | 2/2012 | John |
| 8,169,185 | B2 | 5/2012 | Partovi et al. |
| 8,183,827 | B2 | 5/2012 | Lyon et al. |
| 8,222,860 | B2 | 7/2012 | Kamijo et al. |
| 8,304,935 | B2 | 11/2012 | Hall et al. |
| 8,324,759 | B2 | 12/2012 | Hall et al. |
| 8,362,651 | B2 | 1/2013 | Joannopoulos et al. |
| 8,395,282 | B2 | 3/2013 | Joannopoulos et al. |
| 8,395,283 | B2 | 3/2013 | Joannopoulos et al. |
| 8,400,017 | B2 | 3/2013 | Hall et al. |
| 8,400,018 | B2 | 3/2013 | Joannopoulos et al. |
| 8,400,019 | B2 | 3/2013 | Joannopoulos et al. |
| 8,400,020 | B2 | 3/2013 | Joannopoulos et al. |
| 8,400,021 | B2 | 3/2013 | Joannopoulos et al. |
| 8,400,022 | B2 | 3/2013 | Joannopoulos et al. |
| 8,400,023 | B2 | 3/2013 | Joannopoulos et al. |
| 8,400,024 | B2 | 3/2013 | Joannopoulos et al. |
| 8,410,636 | B2 | 4/2013 | Hall et al. |
| 8,441,154 | B2 | 5/2013 | Karalis et al. |
| 8,461,719 | B2 | 6/2013 | Schatz et al. |
| 8,461,720 | B2 | 6/2013 | Hall et al. |
| 8,461,721 | B2 | 6/2013 | Hall et al. |
| 8,461,722 | B2 | 6/2013 | Hall et al. |
| 8,466,583 | B2 | 6/2013 | Karalis et al. |
| 8,466,654 | B2 | 6/2013 | Sieber et al. |
| 8,466,660 | B2 | 6/2013 | Robert et al. |
| 8,471,410 | B2 | 6/2013 | Hall et al. |
| 8,476,788 | B2 | 7/2013 | Hall et al. |
| 8,482,158 | B2 | 7/2013 | Hall et al. |
| 8,487,480 | B1 | 7/2013 | Schatz et al. |
| 8,497,601 | B2 | 7/2013 | Hall et al. |
| 8,513,915 | B2 | 8/2013 | Patel et al. |
| 8,517,126 | B2 | 8/2013 | Atarashi |
| 8,525,370 | B2 | 9/2013 | Walley et al. |
| 8,536,830 | B2 | 9/2013 | Holmes et al. |
| D692,010 | S | 10/2013 | Verghese |
| 8,552,592 | B2 | 10/2013 | Schatz et al. |
| 8,561,770 | B2 | 10/2013 | Stoicoviciu |
| 8,569,914 | B2 | 10/2013 | Hall et al. |
| 8,569,993 | B2 | 10/2013 | Wolfien |
| 8,907,811 | B2 * | 12/2014 | Windstrup ............ B60L 11/184 340/870.02 |
| 9,187,006 | B2 | 11/2015 | Chen |
| 9,348,381 | B2 | 5/2016 | Khoo et al. |
| 9,739,844 | B2 | 8/2017 | Widmer et al. |
| 9,796,280 | B2 * | 10/2017 | McCool ................ B60L 11/182 |
| 2001/0002788 | A1 * | 6/2001 | Koike ..................... H02J 50/10 320/108 |
| 2004/0142733 | A1 * | 7/2004 | Parise ..................... H02J 7/025 455/572 |
| 2008/0101842 | A1 * | 5/2008 | Takahashi ............. B41J 13/076 400/617 |
| 2008/0300660 | A1 | 12/2008 | John et al. |
| 2009/0045773 | A1 * | 2/2009 | Pandya ..................... B60L 53/14 320/108 |
| 2009/0139781 | A1 * | 6/2009 | Straubel .................. B60L 50/64 180/65.1 |
| 2009/0249076 | A1 | 10/2009 | Reed et al. |
| 2010/0017249 | A1 * | 1/2010 | Fincham ..................... B60L 3/12 705/412 |
| 2010/0094496 | A1 * | 4/2010 | Hershkovitz ............. B60L 3/12 701/22 |
| 2010/0102640 | A1 | 4/2010 | Joannopoulos et al. |
| 2010/0127575 | A1 | 5/2010 | Joannopoulos et al. |
| 2010/0133918 | A1 | 6/2010 | Joannopoulos et al. |
| 2010/0133919 | A1 | 6/2010 | Joannopoulos et al. |
| 2010/0133920 | A1 | 6/2010 | Joannopoulos et al. |

(56) References Cited

U.S. PATENT DOCUMENTS

| | | | |
|---|---|---|---|
| 2010/0156346 A1 | 6/2010 | Takada et al. | |
| 2010/0171368 A1 | 7/2010 | Schatz et al. | |
| 2010/0181845 A1 | 7/2010 | Fiorello et al. | |
| 2010/0185353 A1* | 7/2010 | Barwick | B62D 7/026 701/23 |
| 2010/0187911 A1 | 7/2010 | Joannopoulos et al. | |
| 2010/0207458 A1 | 8/2010 | Joannopoulos et al. | |
| 2010/0219694 A1 | 9/2010 | Kurs et al. | |
| 2010/0231340 A1 | 9/2010 | Fiorello et al. | |
| 2010/0237709 A1 | 9/2010 | Hall et al. | |
| 2010/0259108 A1 | 10/2010 | Giler et al. | |
| 2010/0259110 A1 | 10/2010 | Kurs et al. | |
| 2010/0277121 A1 | 11/2010 | Hall et al. | |
| 2010/0308939 A1* | 12/2010 | Kurs | H02J 50/12 333/219.2 |
| 2011/0043049 A1 | 2/2011 | Karalis et al. | |
| 2011/0074218 A1 | 3/2011 | Karalis et al. | |
| 2011/0074346 A1 | 3/2011 | Hall et al. | |
| 2011/0074347 A1 | 3/2011 | Karalis et al. | |
| 2011/0078092 A1* | 3/2011 | Kim | B60L 58/16 705/412 |
| 2011/0089895 A1 | 4/2011 | Karalis et al. | |
| 2011/0095618 A1 | 4/2011 | Schatz et al. | |
| 2011/0121920 A1 | 5/2011 | Kurs et al. | |
| 2011/0140538 A1* | 6/2011 | Jung | H02J 50/60 307/104 |
| 2011/0156494 A1 | 6/2011 | Mashinsky et al. | |
| 2011/0181240 A1* | 7/2011 | Baarman | H04B 5/0037 320/108 |
| 2011/0187320 A1* | 8/2011 | Murayama | H02J 7/00 320/108 |
| 2011/0193416 A1 | 8/2011 | Campanella et al. | |
| 2011/0193419 A1 | 8/2011 | Karalis et al. | |
| 2011/0204845 A1* | 8/2011 | Paparo | H01F 38/14 320/108 |
| 2011/0221387 A1* | 9/2011 | Steigerwald | B60L 53/60 180/65.29 |
| 2011/0254503 A1* | 10/2011 | Widmer | B60L 3/0069 320/108 |
| 2011/0285349 A1* | 11/2011 | Widmer | B60L 11/182 320/108 |
| 2012/0007441 A1 | 1/2012 | John et al. | |
| 2012/0032522 A1 | 2/2012 | Schatz et al. | |
| 2012/0049795 A1* | 3/2012 | Dougherty | B60L 53/14 320/109 |
| 2012/0062345 A1 | 3/2012 | Kurs et al. | |
| 2012/0068549 A1 | 3/2012 | Karalis et al. | |
| 2012/0086284 A1 | 4/2012 | Capanella et al. | |
| 2012/0086867 A1 | 4/2012 | Kesler et al. | |
| 2012/0091794 A1 | 4/2012 | Campanella et al. | |
| 2012/0091795 A1 | 4/2012 | Fiorello et al. | |
| 2012/0091796 A1 | 4/2012 | Kesler et al. | |
| 2012/0091797 A1 | 4/2012 | Kesler et al. | |
| 2012/0091819 A1 | 4/2012 | Kulikowski et al. | |
| 2012/0091820 A1 | 4/2012 | Campanella et al. | |
| 2012/0091949 A1 | 4/2012 | Campanella et al. | |
| 2012/0091950 A1 | 4/2012 | Campanella et al. | |
| 2012/0098350 A1 | 4/2012 | Campanella et al. | |
| 2012/0098483 A1 | 4/2012 | Patel | |
| 2012/0112531 A1 | 5/2012 | Kesler et al. | |
| 2012/0112532 A1 | 5/2012 | Kesler et al. | |
| 2012/0112534 A1 | 5/2012 | Kesler et al. | |
| 2012/0112535 A1 | 5/2012 | Karalis et al. | |
| 2012/0112536 A1 | 5/2012 | Karalis et al. | |
| 2012/0112538 A1 | 5/2012 | Kesler et al. | |
| 2012/0112691 A1 | 5/2012 | Kurs et al. | |
| 2012/0119569 A1 | 5/2012 | Karalis et al. | |
| 2012/0119575 A1 | 5/2012 | Kurs et al. | |
| 2012/0119576 A1 | 5/2012 | Kesler et al. | |
| 2012/0119698 A1 | 5/2012 | Karalis et al. | |
| 2012/0139355 A1 | 6/2012 | Ganem et al. | |
| 2012/0153733 A1 | 6/2012 | Schatz et al. | |
| 2012/0153738 A1 | 6/2012 | Karalis et al. | |
| 2012/0153893 A1 | 6/2012 | Schatz et al. | |
| 2012/0184338 A1 | 7/2012 | Kesler et al. | |
| 2012/0203410 A1 | 8/2012 | Wechlin et al. | |
| 2012/0206096 A1 | 8/2012 | John et al. | |
| 2012/0228960 A1 | 9/2012 | Karalis et al. | |
| 2012/0235500 A1 | 9/2012 | Ganem et al. | |
| 2012/0235501 A1 | 9/2012 | Kesler et al. | |
| 2012/0235502 A1 | 9/2012 | Kesler et al. | |
| 2012/0235503 A1 | 9/2012 | Kesler et al. | |
| 2012/0235505 A1 | 9/2012 | Schatz et al. | |
| 2012/0235633 A1 | 9/2012 | Kesler et al. | |
| 2012/0235634 A1 | 9/2012 | Hall et al. | |
| 2012/0235636 A1 | 9/2012 | Partovi | |
| 2012/0239117 A1 | 9/2012 | Kesler et al. | |
| 2012/0248888 A1 | 10/2012 | Kesler et al. | |
| 2012/0256494 A1 | 10/2012 | Kesler et al. | |
| 2012/0313449 A1 | 12/2012 | Kurs et al. | |
| 2012/0313742 A1 | 12/2012 | Kurs et al. | |
| 2013/0007949 A1 | 1/2013 | Kurs et al. | |
| 2013/0020878 A1 | 1/2013 | Karalis et al. | |
| 2013/0024059 A1 | 1/2013 | Miller et al. | |
| 2013/0029595 A1 | 1/2013 | Widmer et al. | |
| 2013/0033118 A1 | 2/2013 | Karalis et al. | |
| 2013/0033224 A1 | 2/2013 | Raedy et al. | |
| 2013/0033228 A1 | 2/2013 | Raedy et al. | |
| 2013/0038276 A1 | 2/2013 | Raedy et al. | |
| 2013/0038277 A1 | 2/2013 | Chan et al. | |
| 2013/0038402 A1 | 2/2013 | Karalis et al. | |
| 2013/0057364 A1 | 3/2013 | Kesler et al. | |
| 2013/0062966 A1 | 3/2013 | Verghese et al. | |
| 2013/0069441 A1 | 3/2013 | Verghese et al. | |
| 2013/0069753 A1 | 3/2013 | Kurs et al. | |
| 2013/0088195 A1 | 4/2013 | Yoon et al. | |
| 2013/0099587 A1 | 4/2013 | Lou et al. | |
| 2013/0154389 A1 | 6/2013 | Kurs et al. | |
| 2013/0159956 A1 | 6/2013 | Verghese et al. | |
| 2013/0181541 A1 | 7/2013 | Karalis et al. | |
| 2013/0193913 A1 | 8/2013 | Takada et al. | |
| 2013/0234532 A1 | 9/2013 | Fells et al. | |
| 2013/0249479 A1 | 9/2013 | Partovi | |
| 2013/0265004 A1 | 10/2013 | Iizuka et al. | |
| 2013/0278073 A1 | 10/2013 | Kurs et al. | |
| 2013/0278074 A1 | 10/2013 | Kurs et al. | |
| 2013/0278210 A1 | 10/2013 | Cook et al. | |
| 2013/0285604 A1 | 10/2013 | Partovi et al. | |
| 2013/0300364 A1 | 11/2013 | Baier et al. | |
| 2014/0021908 A1 | 1/2014 | McCool et al. | |
| 2014/0194092 A1 | 7/2014 | Wanstedt et al. | |
| 2015/0175025 A1 | 6/2015 | Barbul et al. | |
| 2018/0111492 A1 | 4/2018 | McCool et al. | |

OTHER PUBLICATIONS

Press Release: National Grid Further Expands ChargePoint Network Driving EV Adoption Thoughout Massachusetts, Chargepoint America, Feb. 28, 2012, 18 pages.

New MyFord Mobile App Keeps Focus Electric Owner Engaged and in Control of Electric Car Experience, Press Release, Ford Motor Company, Available online at http://ophelia.sdsu.edu:8080/ford/06-05-2011/news-center/news/press-releases/press-releases-detail/pr-new-myford-mobile-app-keeps-focus-33763.html, Accessed from internet on May 9, 2017, Jun. 5, 2011, 2 pages.

International Application No. PCT/US2013/033720, International Search Report and Written Opinion dated Jul. 1, 2013, 9 pages.

Ridden, Evatran Unveils Wireless Charging Solution for Electric Vechicles, Available online at http://www.gizmag.com/evatran-plugless-power-induction-electric-vehicle-charging/15904/, Accessed from internet on May 9, 2017, Aug. 1, 2010, 5 pages.

PCT/US2017/057910 , "International Search Report and Written Opinion", dated Jan. 25, 2018, 13 pages.

U.S. Appl. No. 13/849,904, "Advisory Action", dated Apr. 8, 2016, 3 pages.

U.S. Appl. No. 13/849,904, "Advisory Action", dated Feb. 23, 2017, 3 pages.

U.S. Appl. No. 13/849,904, "Final Office Action", dated Oct. 20, 2016, 23 pages.

U.S. Appl. No. 13/849,904, "Final Office Action", dated Feb. 23, 2016, 24 pages.

(56) References Cited

OTHER PUBLICATIONS

U.S. Appl. No. 13/849,904, "Non-Final Office Action", dated May 20, 2015, 14 pages.
U.S. Appl. No. 13/849,904, "Non-Final Office Action", dated Jun. 9, 2016, 22 pages.
U.S. Appl. No. 13/849,904, "Notice of Allowance", dated Jun. 20, 2017, 9 pages.
U.S. Appl. No. 13/849,904, "Notice Of Allowance", dated Mar. 27, 2017, 9 pages.

* cited by examiner

SYSTEMS AND MOBILE APPLICATION FOR ELECTRIC WIRELESS CHARGING STATIONS

CROSS REFERENCE TO RELATED APPLICATIONS

This disclosure is a continuation of, and claims the benefit of priority to, U.S. patent application Ser. No. 13/849,904 titled "Systems and Mobile Application for Electric Wireless Charging Stations" and filed Mar. 25, 2013, which claims priority from U.S. Prov. App. No. 61/614,604, filed Mar. 23, 2012, and U.S. Prov. App. No. 61/794,237, filed on Mar. 15, 2013, each of which is hereby incorporated by reference in its entirety into the present application.

TECHNICAL FIELD

The present invention is generally in the field of electric charging, and relates to the systems, hardware, and mobile application software for implementing wireless charging zones for electric vehicles.

BACKGROUND

Commercial and personal transportation is currently dependent on fossil fuels. Use of fossil fuels, however, has become increasingly problematic. Rising costs, pollution, safety, and many countries dependence on foreign sources of fossil fuels have lead consumers to seek alternatives to traditional fuel-powered vehicles.

One alternative to traditional vehicles is electrically powered vehicles and electric/fuel hybrid vehicles. Electric vehicles utilize one or more electrical motors for propulsion, typically powered by batteries. The batteries can be charged by one or more sources of electricity, including fossil fuels, nuclear power, and renewable sources such as solar and wind power. Electric vehicles currently must be plugged in to a specially designed outlet to receive power for charging the batteries. Based on the present efficiency of both the batteries and electric motors, the range of electric vehicles is limited.

SUMMARY

The present disclosure describes devices, systems and methods for mobile application for electric wireless charging stations.

In some aspects, a wireless charging station can include a charging unit, a control module, a communication unit, and a housing body. The charging unit can wirelessly transfer power to a receiver in a vehicle. The control module can communicatively couple to the charging unit. The control module can also activate the charging unit to transfer the power to the vehicle wirelessly in response to determining the receiver is aligned with the charging unit. The communication unit can communicatively couple to the control module. The communication unit can also communicate alignment data with devices associated with the vehicle for displaying a visual indicator to facilitate moving the vehicle such that the receiver is aligned with the charging unit. The housing body can house the charging unit and the control module. The housing body can have a conduit therethrough in which a communication medium is positioned for communicatively coupling the charging unit and the control module to a utility line. The housing body can include a mounting ring for coupling the charging unit to a lid of the housing body.

In additional or alternative aspects, a wireless charging system can include a charging station and a server. The charging station can include a charging unit, a control module, a communication unit, and a housing body. The charging unit can wirelessly transfer power to a receiver in a vehicle. The control module can communicatively couple to the charging unit and activate the charging unit to transfer the power to the vehicle wirelessly in response to determining the receiver is aligned with the charging unit. The communication unit can communicatively couple to the control module and communicate information including alignment data with the server. The housing body can house the charging unit and the control module. The server can communicatively couple to the charging station and maintain an application that is configured to be accessible through the one or more devices. The server can also communicate the information regarding the charging station to the one or more devices. The alignment data can be displayed via a user interface for providing a visual indicator to facilitate moving the vehicle such that the receiver is aligned with the charging unit. The visual indicator can include a vehicle icon and a charging unit icon to illustrate the position of the receiver relative to the position of the charging unit. The charging unit icon can overlap with the vehicle icon and the user interface can include an alert for indicating an alignment of the charging unit and the receiver.

In additional or alternative aspects, a method can be performed to wirelessly charge a vehicle. The method can include transmitting information about one or more charging stations to a device associated with the vehicle. The method can further include receiving from the device a request to charge the vehicle at a specific charging station from the one or more charging stations. The method can further include identifying when the vehicle is proximate the specific charging station. The method can further include providing alignment data to a second device associated with the vehicle that displays a visual indicator to facilitate moving the vehicle such that a receiver in the vehicle is aligned with a charging unit positioned in a housing body of the specific charging station. The housing body can include a mounting ring that couples a charging unit to a lid of the housing body. The method can further include activating the charging unit in the specific charging station to transmit power to the receiver in the vehicle from a utility line communicatively coupled to the charging unit by a communication medium positioned in a conduit of the housing body.

The details of one or more aspects and examples are set forth in the accompanying drawings and the description below. Other features and aspects will become apparent from the description, the drawings and the claims.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In such drawings.

DETAILED DESCRIPTION

Figure 1:
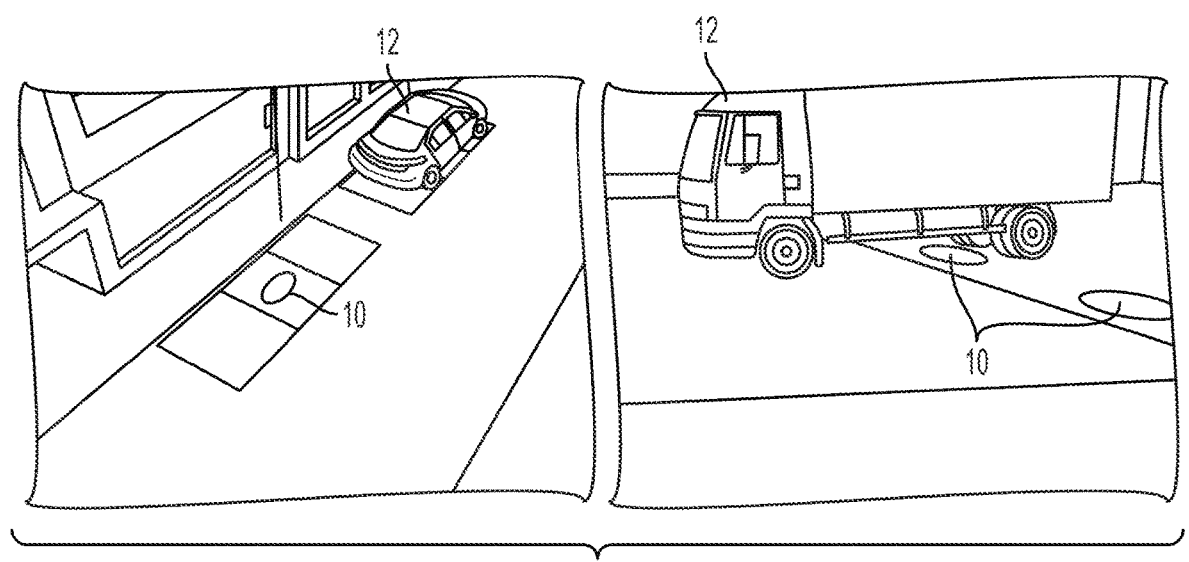
FIG. 1 depicts exemplary personal and commercial charging stations in accordance with exemplary implementation of embodiments of the present invention.

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

Various exemplary embodiments are directed to a network of charging stations 10 or zones to charge electric vehicles 12 wirelessly through induction charging or magnetic resonance charging. As shown in the example of FIG. 1, charging stations 10 may be utilized for personal and commercial electric vehicles 12. Charging stations 10 may be placed in designated areas on public streets and on private or city land, such as garages and warehouses used to park or store personal and commercial electric vehicles 12. Though charging stations 10 may be placed anywhere, placement may be optimized to support and promote electric charging in specific zones, such as residential areas. Charging stations 10 may also be effective, for example for commercial vehicles 12, in designated loading zones. In an exemplary implementation, a delivery truck may recharge while off-loading goods, extending the range of the delivery truck and enabling secondary systems, such as refrigeration, to be run off of electric batteries.

Figure 2:
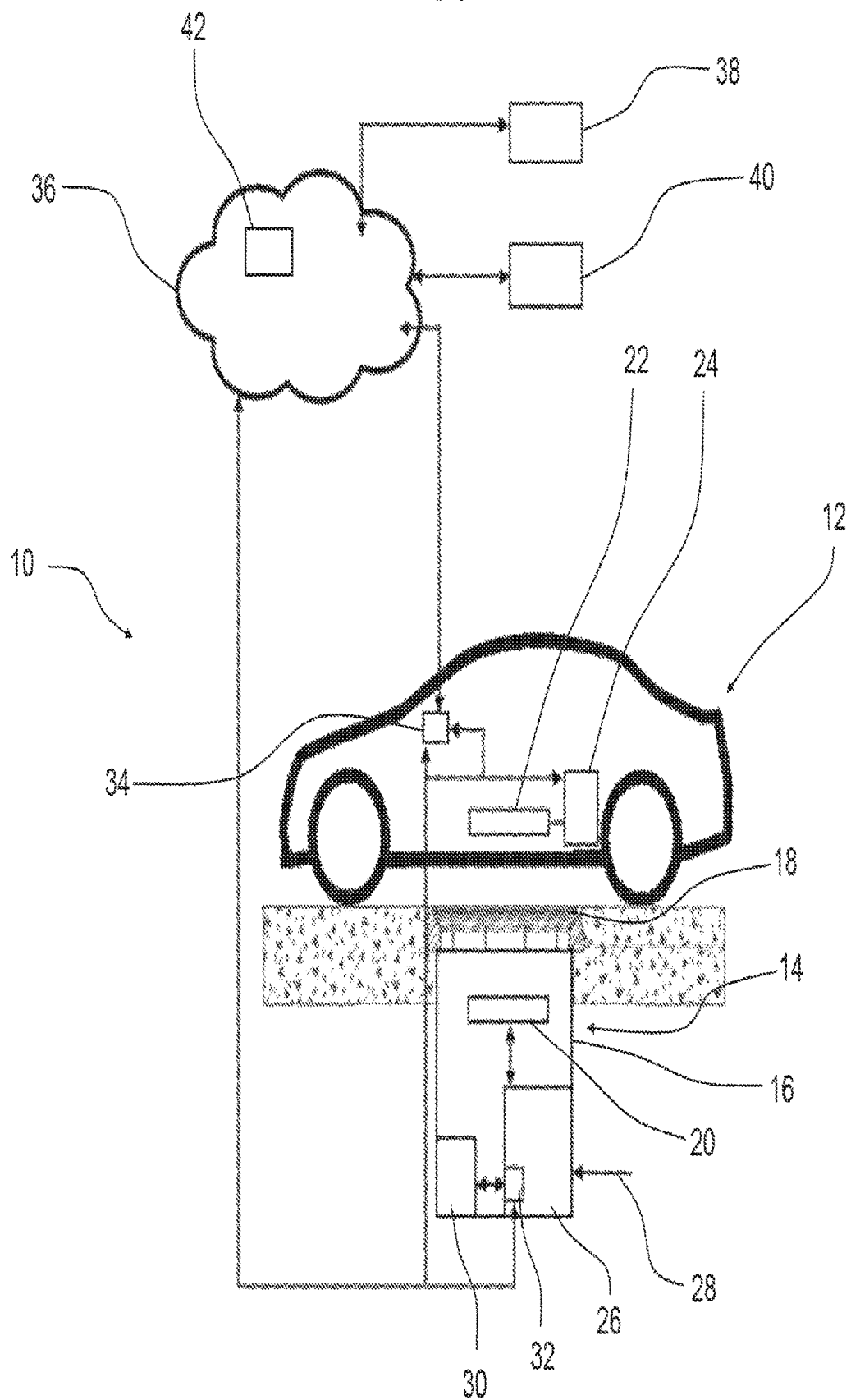
FIG. 2 is a schematic of an exemplary charging station in accordance with exemplary implementation of embodiments of the present invention.
Figure 3:
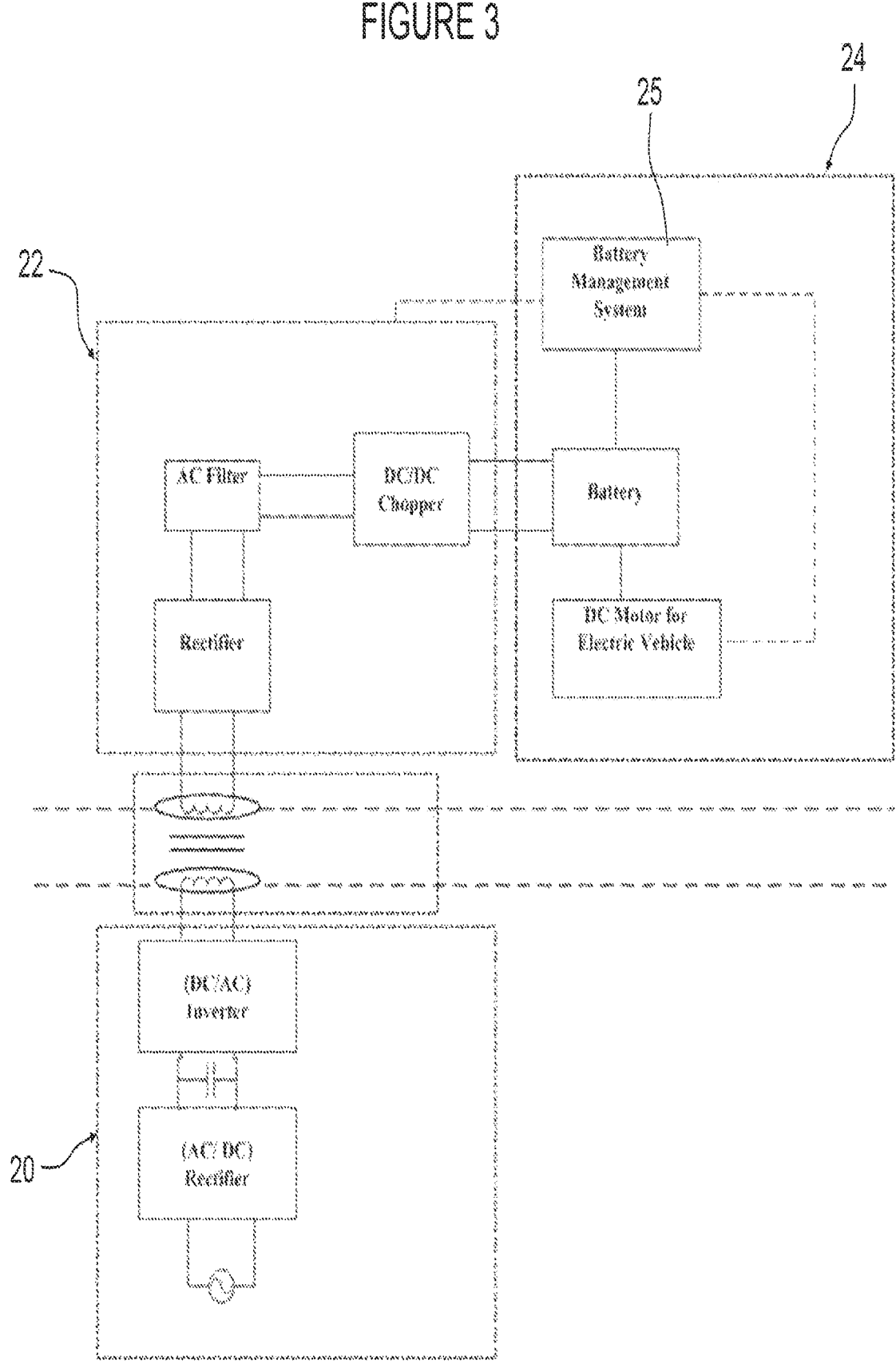
FIG. 3 is a schematic view of an exemplary charging unit, vehicle receiver, and related components in accordance with exemplary implementations of embodiments of the present invention.

FIG. 2 depicts a vehicle 12 positioned above a charging station 10. Though a personal vehicle 12 is shown, the operation for charging commercial vehicles is essentially the same. The vehicle 12 parks above a charger housing 14 that may be positioned below street level as shown in FIG. 2, though various components of the charging station 10 may also be positioned at or above street level. An exemplary housing 14 is depicted in FIG. 3. The housing 14 includes an outer body 16 surrounding an interior and a removable cover 18 allowing access to the interior of the housing body 16. The interior receives and retains components associated with charging the vehicle 12 and performing various other operations as described herein. The cover 18 may be similar to a typical manhole cover and may including various locks or other security features to prevent unauthorized access to the housing 14. The housing 14 may be waterproof and shock proof, and be capable of withstanding various loads. In an exemplary embodiment, the housing 14 is rated at 25 ton PSI resistance. The housing 14 may include various passages for wires and components. These passages may include seals or valves as needed. The housing may also include various thermal or electromagnetic shielding. The housing 14 may be made from materials comprising metals, polymers, ceramics, and composite materials. The materials may incorporate various fillers and reinforcements such as fiberglass.

The housing 14 may contain various electronic and mechanical components associated with the charging station 10. For example, a charging unit 20 is positioned in the housing 14. The charging unit 20 may be positioned proximate the cover 18 in order to reduce the distance between the charging unit 20 and a receiver 22 positioned on the vehicle 12. The charging unit 20 is capable of wirelessly transmitting power to the receiver 22 and may be capable of fast charging at higher voltages and currents. The charging unit 20 and the receiver 22 may include various configurations of coils having different sizes, orientations, number of loops, and loop diameters, and made from different materials for transmitting and receiving power through induction or magnetic resonance. Various exemplary embodiments may also utilize other forms of wireless power transfer, such as electromagnetic radiation. The receiver 22 is electrically connected to a battery unit 24 which may include one or more rechargeable batteries and a battery management system 25. In an exemplary embodiment, the battery management system 25 is capable of monitoring one or more properties of the batteries, for example charge level, charging rate, temperature, and usage efficiency. The receiver 22 is capable of transferring power received from the charging station 10 to charge the batteries. Various electrical components such as power converters, rectifiers and various control units may be associated with the charging unit 20 and the receiver 22. Various components may also be positioned outside of the housing 14 as desired, including the charging unit 20. A more detailed schematic of an exemplary power system is shown in FIG. 3.

The charging unit 20 is connected to a control unit 26. The control unit 26 may include various electronic, mechanical, and/or electromechanical components to perform various control, analytical, and communication functions such as those described herein. The control unit 26 may include one or more microcontrollers, such as an Arduino board to perform dedicated tasks and functions. Though the control unit 26 is depicted and described as a single unit for clarity, it may be comprised of several individual units, working together or in isolation, to perform the various functions described herein.

The control unit 26 may be connected to a power source 28, for example an electrical utility line. The control unit 26 may contain various electronic components to convert or modify the power received from the power source 28 and supply the charging unit 20 with power in an appropriate amount, having the correct current and frequency. The control unit 26 is capable of selectively powering the charging unit 20 at appropriate times, such as by activating the charging unit 20 when a vehicle 12 is detected or a request for charging is received, or by deactivating the charging unit 20 when a vehicle 12 leaves or the battery 24 is completely charged.

The charging station 10 may include one or more sensors 30 used to determine the position of the vehicle 12. The sensors 30 may be located in the housing 14 as depicted in FIG. 2 and also may be located remotely from the housing 14. Various types of sensors including visual sensors, proximity sensors, pressure sensors, infrared sensors, and GPS sensors may be used. The control unit 26 may be capable of receiving and analyzing signals from the sensors 30 or a dedicated unit may analyze the output from the sensors 30. The sensors may also be configured to determine if any foreign objects are in or around the charging station 10. This information may be communicated to users for safety reasons and may also be communicated to a monitor or manager of the system or a city department to investigate or remove any foreign objects. Foreign object detection may also prevent or discontinue wireless charging when it is determined that a foreign object is present between the charging unit 20 and the receiver 22 to prevent harm, damage, or other incident.

The control unit 26 may contain, or be connected to, a communication unit 32 to receive and transmit information from various sources. The communication unit 32 may receive and transmit information through a wired connection and/or wirelessly. Wired connections may be achieved through one or more data or network ports. Wireless communication may be achieved through radio frequency, Bluetooth, or WiFi wireless transmission as well as optic, infrared, or other light signaling. The communication unit 32 may be in communication, either through a data connection or an electrical connection to receive and transmit information for other components in the charging station 10. The communication unit may also communicate with devices and locations outside of the charging station 10. The controller 26 and the communication unit 32 may incorporate a beagleboard or beaglebone type device to provide computing and communication functionality.

In various exemplary embodiments, the communication unit 32 transmits and receives information to and from various external devices such as the battery management system 25, the sensors 30, and one or more mobile devices 34. Mobile devices 34 may include any mobile electronic device, such as a mobile phone, tablet, laptop or other computing device. The mobile device 34 may also be a vehicle related device, such as a global positioning device (GPS), dashboard or other onboard, vehicle computer. A vehicle related mobile device 34 may be a dedicated unit or integrated with the vehicle 12 to perform different functions. The mobile device 34 may be capable of receiving information related to the vehicle 12, for example position, battery level, and charging rate. Accordingly, the battery management system 25 may also be able to communicate directly with one or more mobile devices 34.

The communication unit 32 may also be capable of transmitting and receiving information to and from a remote server 36. The remote server 36 may include a dedicated server or a storage network, such as a cloud computing network. The communication unit 32 transmits information to the remote server 36 via the Internet or a dedicated network, either through a hardwired connection or wireless connection as discussed above. In various exemplary embodiments, the sensors 30 communicate with the remote server 36 directly or through the communication unit 32. Information sent to the remote server 36 may include operating status, occupancy status, charging efficiency and statics, sensor data, and usage data. The remote server 36 may also communicate with the mobile device 34 and other devices, such as an additional user device 38 as well as an administrator system 40. The user device 38 may include any user computing device such as a mobile device 34 described above or a stationary computer or terminal. The administrator system 40 may be capable of performing various tasks and operations such as monitoring, management, customer service and support, and/or scheduling. The administrator system 40 may be capable of controlling, monitoring, testing or calibrating the sensors 30. The administrator system 40 may also be capable of sending alerts to users, authorities, and other relevant parties, for example police, fire, medical services, or towing services.

In various exemplary embodiments, the remoter server 36 may be designed to interact with one or more databases 42 for storing information relating to different charging stations 10, different vehicles 12, and/or different users. The server 36 may implement a database management system for storing, compiling, and organizing data, and to allow a user and administrators to access and search the stored data. The databases 42 may contain different units for storing data related to different topics, for example charging station 10 information, user account information, and vehicle 12 information.

FIGS. 4-11 depict certain components of an exemplary charging station 10 in greater detail. The housing body 16 may be an enclosure formed from concrete. A mounting ring 44 is positioned on the housing body 16. The cover 18 rests on the mounting ring 44. The mounting ring 44 may help seal the housing 14, and may allow the charging unit 20 to be mounted close to the cover 18. A conduit 46 is provided in the housing body 16 to receive one or more utility lines 48, for example an external power cable and an internet cable.

The cover 18 may have an opening for receiving a control module 50 having a lid 52 which is visible and/or accessible through the cover 18. The control module 50 may be removable from the charging housing 14. In various embodiments, the control module 50 may be removed from the housing 14 without removing the cover 18. The lid 52 may contain a set of indicators 54, for example light emitting diodes (LEDs). The indicators 54 may provide status notifications for the charging unit 10, for example when the unit is currently charging and when an error has occurred. The indicators 54 may transmit different colored light depending on the notification and may also provide visual signals.

Figure 5:
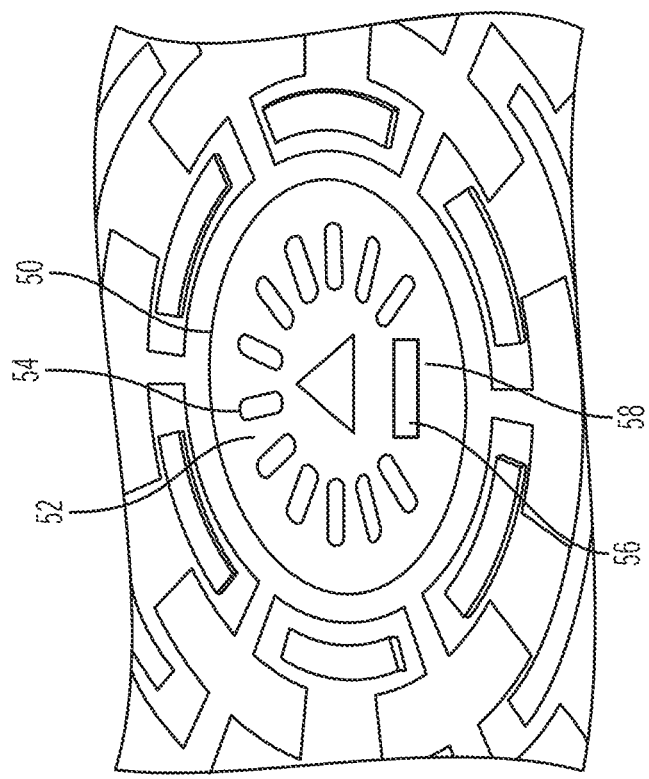
FIG. 5 is an enlarged view of a lid of the charging housing shown in FIG. 4 in accordance with exemplary implementation of embodiments of the present invention.
Figure 4:
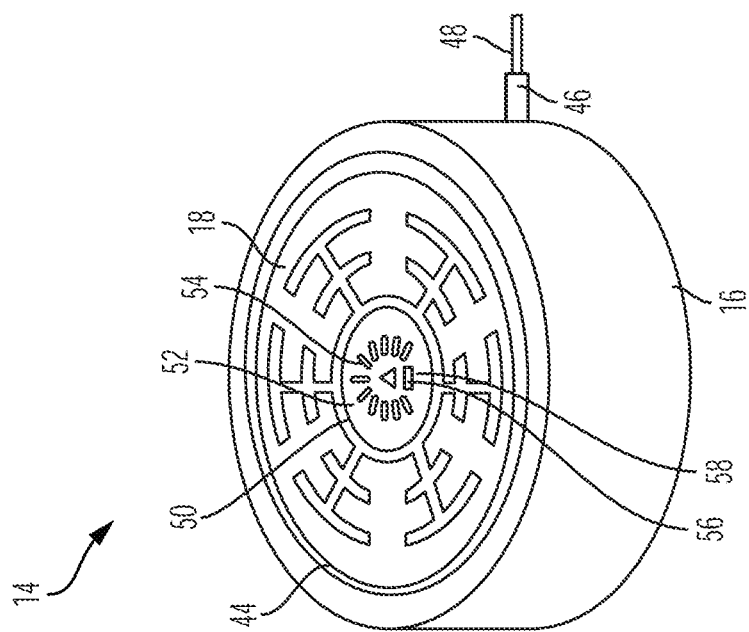
FIG. 4 is a top perspective view of an exemplary charging housing in accordance with exemplary implementation of embodiments of the present invention.
Figure 7:
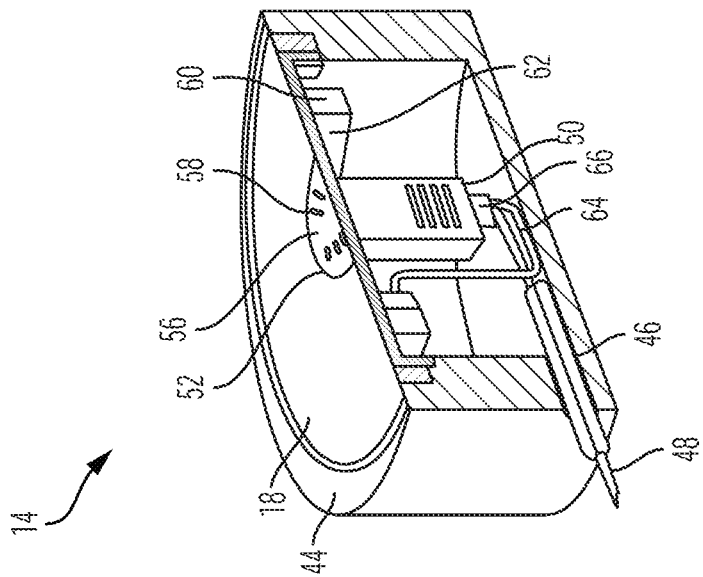
FIG. 7 is a sectional view of the charging housing shown in FIG. 4 in accordance with exemplary implementation of embodiments of the present invention.
Figure 6:
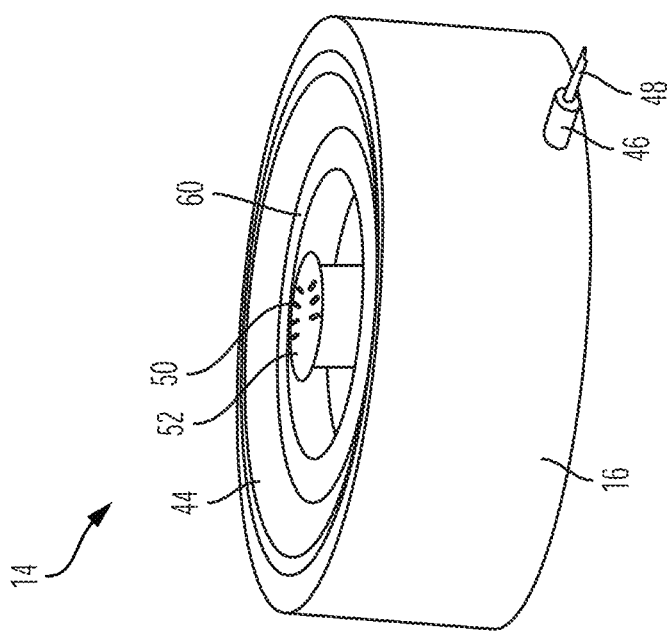
FIG. 6 is top perspective view of the charging housing shown in Figure without a cover in accordance with exemplary implementation of embodiments of the present invention.
Figure 9:
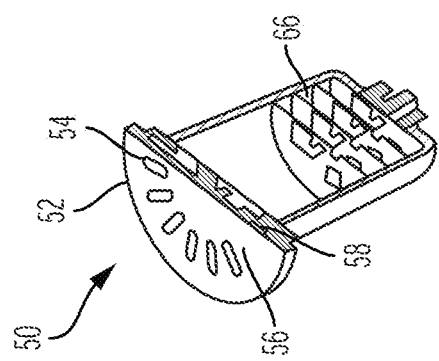
FIG. 9 is a sectional view of the control module shown in FIG. 8 in accordance with exemplary implementation of embodiments of the present invention.
Figure 8:
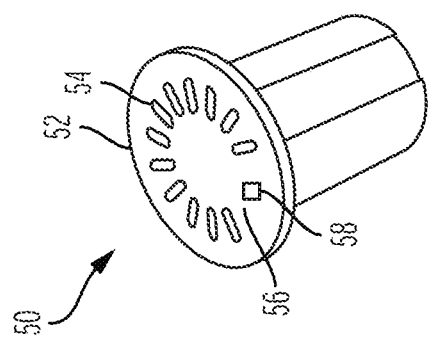
FIG. 8 is a top perspective view of an exemplary control module in accordance with exemplary implementation of embodiments of the present invention.
Figure 11:
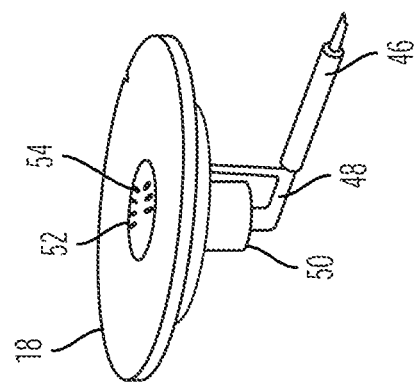
FIG. 11 is a top perspective view of the charging unit shown in FIG. 4 without the housing body and the coil in accordance with exemplary implementation of embodiments of the present invention.
Figure 10:
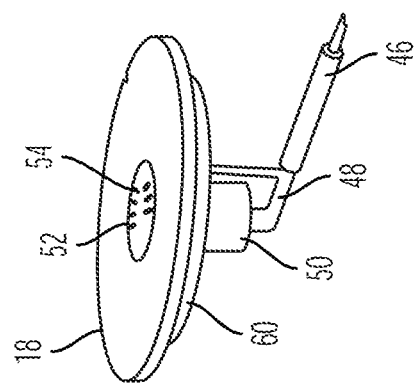
FIG. 10 is a top perspective view of the charging unit shown in FIG. 4 without the housing body in accordance with exemplary implementation of embodiments of the present invention.
Figure 13:
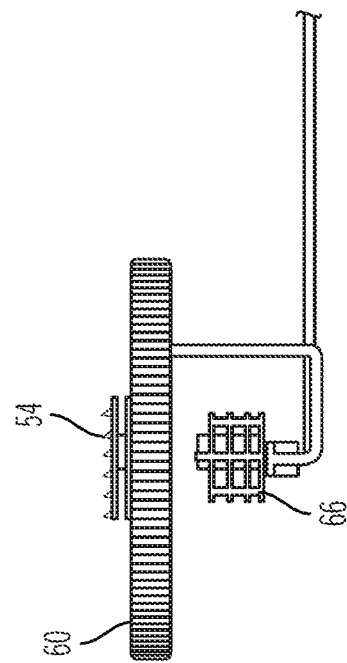
FIG. 13 is a right-side view of the electrical components shown in FIG. 12 in accordance with exemplary implementation of embodiments of the present invention.
Figure 12:
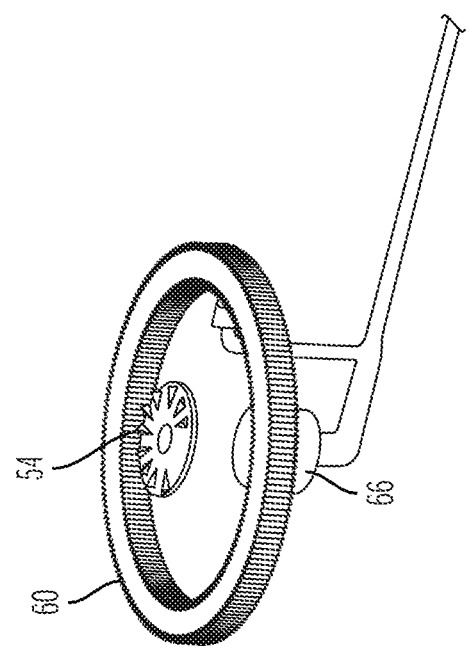
FIG. 12 is a top perspective view of the charging unit shown in FIG. 4 showing electrical components in accordance with exemplary implementation of embodiments of the present invention.

As shown in the examples of FIGS. 5 and 8, the lid 52 may include a door 56 providing access to recess housing one or more jacks 58. The jacks 58 may include one or more ports including but not limited to phone, coaxial, data, USB, or Ethernet, or other electrical connector or connectors designed to send and receive data or electrical signals. An operator may connect to the jacks 58 to perform diagnostics on the charging unit 10.

In an exemplary implementation, interior of the charging housing 14 includes the control module 50 and a coil 60. The coil 60 may be a magnetic resonance power transfer coil. The coil 60 is supported by a mounting bracket 62. The mounting bracket 62 may be coupled to the mounting ring 44. The mounting bracket 62 may be made from a variety of materials and may be formed from a material that will not interfere with the power transfer. The coil 60 receives power from the control module 50 through a power connector 64. The control module 50 houses one or more circuit boards 66. The circuit boards 66 may be printed circuit boards containing a variety of electronic components for performing different functions as discussed herein.

In order to utilize a charging station 10, a user may access an application 100 that allows the user, for example and without limitation, to find an available charging station 10, navigate to the available charging station 10, maneuver their vehicle in a correct position for charging, pay for their charging, and monitor the status of their vehicle. Though described herein for use with the exemplary charging statin 10, the application 100 is not limited to such a use, and may be used for any type of vehicle charging. The application 100 may act as an interface between the remote server 36 and the user and may include various software, firmware, and hardware components for performing the various functions described herein. The solution stack to implement and integrate the application 100 with the overall system may utilize a LAMP (Linux (operating system), Apache HTTP Server, MySQL (database software), and PHP, Perl or Python) bundle or other similar solution stack. The application 100 may be designed with one or more languages or frameworks, including HTML, such as HTML5, WML, XML, Java JavaScript, CCS, such as CCS3, Node.js, and DOM. In various exemplary embodiments shown in the Figures and described herein, the application 100 is provided as a mobile application that can be downloaded and installed by a user to a mobile device 34. The application 100 may also be provided as a web application accessible through the Internet. The application 100 may integrate with other applications, services, such as location based services, and systems utilizing application integration software or middleware, for example WebSphere®.

Figure 14:
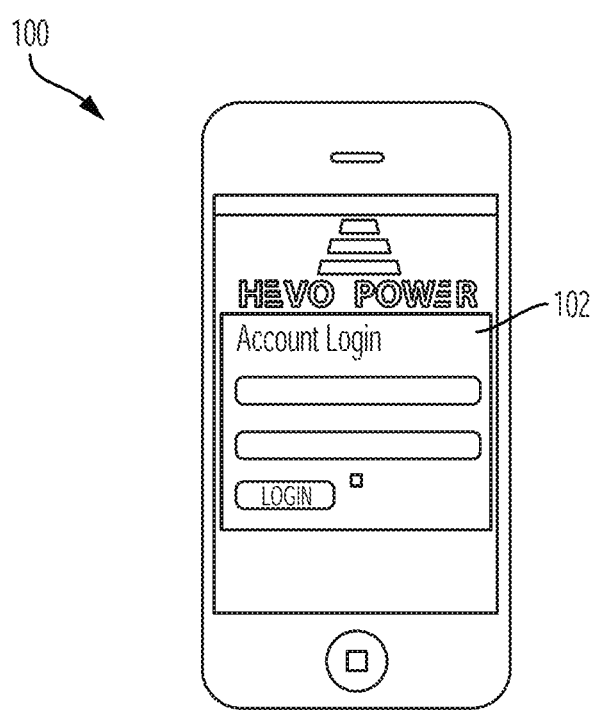
FIG. 14 illustrates an example of a log in screen of the application in accordance with exemplary implementation of embodiments of the present invention.
Figure 15:
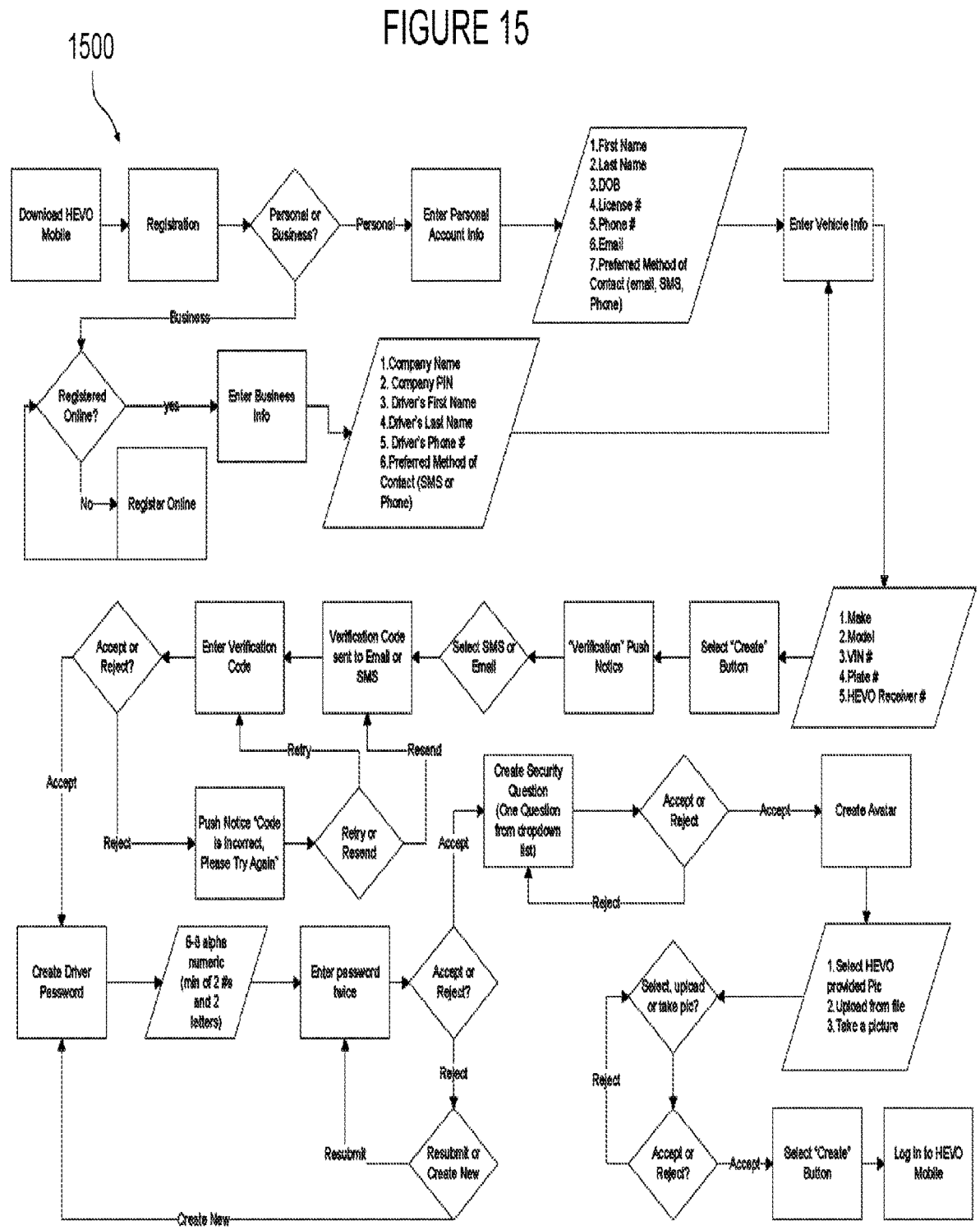
FIG. 15 is a diagram illustrating an example of a registration process in accordance with exemplary implementation of embodiments of the present invention.

According to an exemplary implementation, a user may initially access the application 100 by download the application 100 to a mobile device 34 or by connecting to the application 100 through the Internet. As shown in the example of FIG. 14, the user may be presented with a login screen 102 and have the option to register for an account or to login to an existing account. As shown in the example of FIG. 15, the user may follow a registration process 1500 to register for an account by following a series of prompts. The user can select whether the account is for personal use or for business. If the account is for business use, the user may be asked to register online and provide business information such as company name, the driver's name and phone number, and a preferred method of contact. For a personal account, a user may be asked to provide a name, date of birth, license number, phone number, email address, and a preferred method of contact. The user may then insert vehicle information including make, model, vehicle identification number (VIN), and plate number. The user may also be asked to input an identification number associated with the vehicle 12 receiver 22. After the user provides the necessary information, they may select to create an account.

After the user creates an account, the application 100 may institute a push notification transmitting a verification code to a user's email account and/or phone through, for example, a Short Message Service (SMS). The user may be directed to a screen to enter the received verification code to activate their account. If the verification code is rejected the user may have a certain number of tries to reenter the code. If the verification code is continually rejected, a different verification code may be sent. If the verification code is accepted, the user may be then asked to create a password. Once a suitable password has been created, the user may select a security question, either from a predetermined list or by setting up a security questions and answer in a free-form field. The user may then be given the option of selecting an avatar or profile picture. Picture options may be provided by the application and uploaded by a user. Once the user's account is finalized, the user may be redirected to the login screen 102 to login and access the application.

Figure 16:
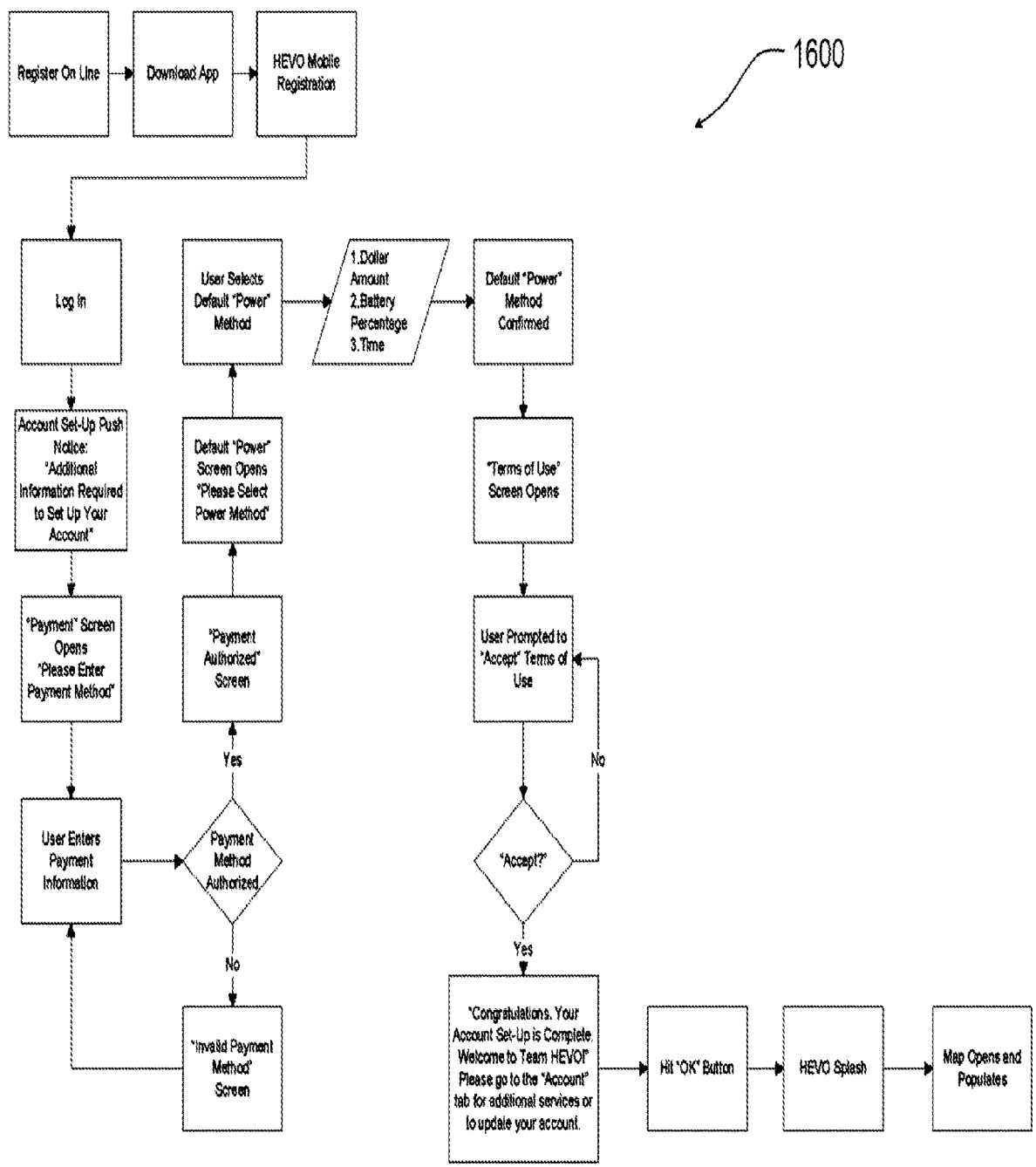
FIG. 16 is a diagram illustrating and example of an initial account process in accordance with exemplary implementation of embodiments of the present invention.

The user may then go through an initial login process 1600, an example of which is depicted in FIG. 16. On the initial login a user may be presented with options to set up personal preferences. The user may link one or more methods of payment to their account, including a debit card, credit card, bank account, or an electronic payment service such as PayPal® or Google Wallet®. Various forms of encryptions and secure protocols may be used to protect financial data. The user may select which payment method is to be used as a default. The user may also be given the option to select a default power method. The user may choose to charge their vehicle by a set dollar amount, a set battery percentage, or a set time. After a user sets up preferences, user may be provided with a "Terms of Use" agreement. This agreement must be accepted prior to completing users account setup.

Figure 17:
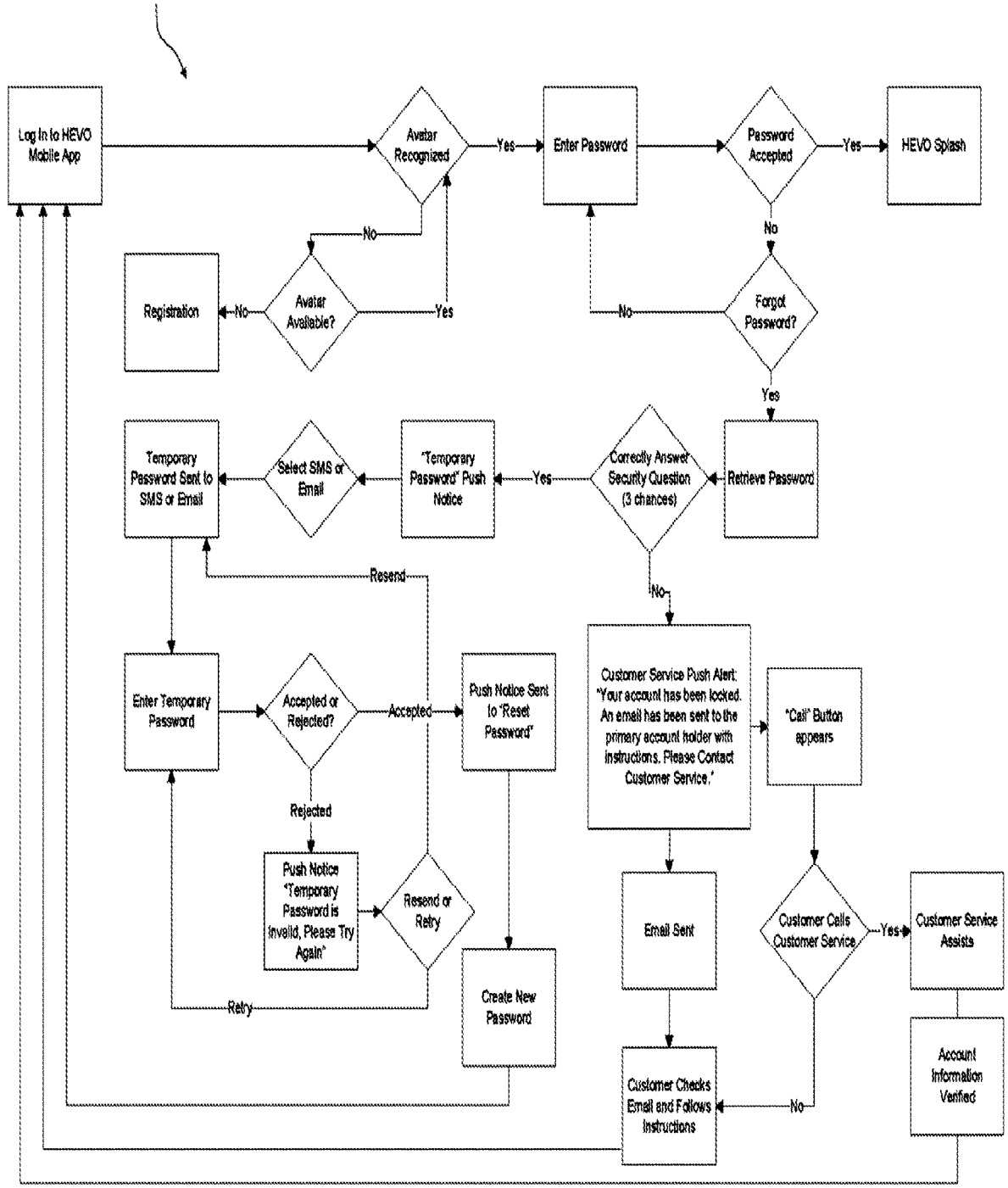
FIG. 17 is a diagram illustrating an example of a log in process in accordance with exemplary implementation of embodiments of the present invention.

FIG. 17 depicts an exemplary login process 1700. As best shown in FIG. 17, when a user logs into user account, the application 100 performs a recognition of the user's username or avatar and password. If the password is accepted the user is logged into the application. If the password is rejected a user may have the option to reenter their password or perform a password retrieval. The user may then be posed with one or more security questions. If the user answers the questions wrong they may be given the option to call a customer service representative for assistance and account verification. If the security questions are answered correctly, a temporary password may be transmitted to the user, for example by email or SMS. The user enters the temporary password into the login screen 102. If the temporary password is rejected, it may be tried again or resent. If the temporary password is accepted, the user may log into their account and be prompted to reset or create a new password.

Figure 18:
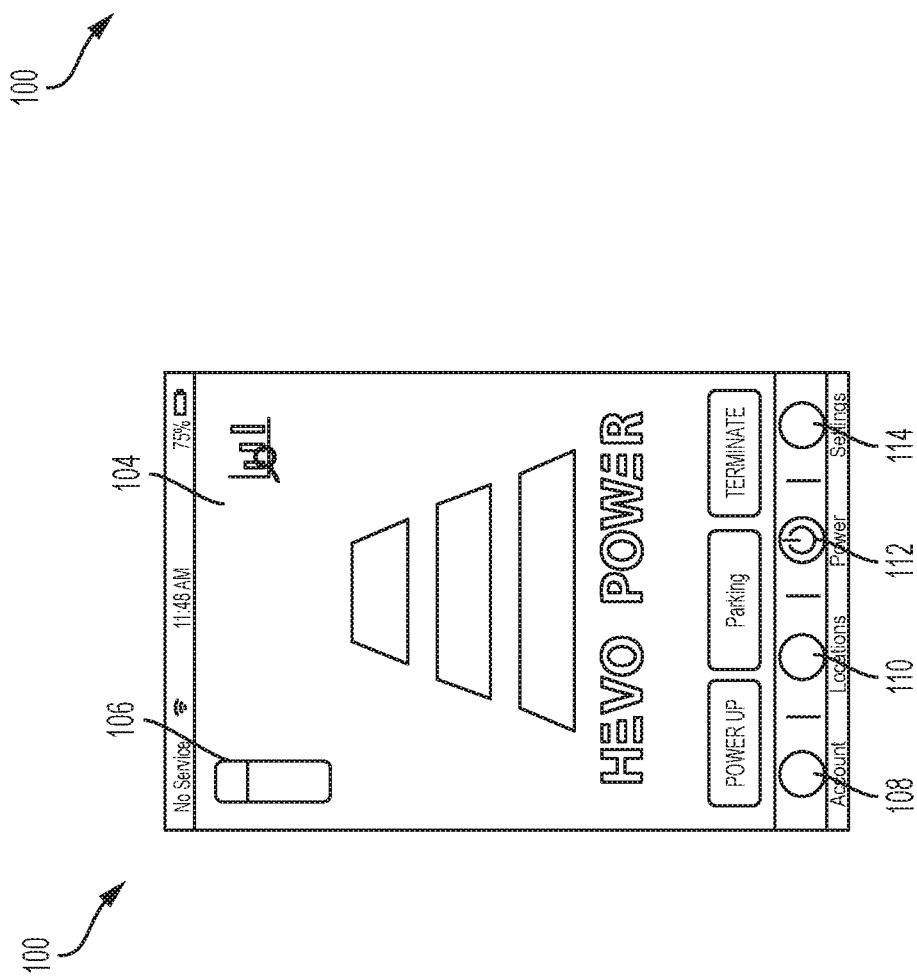
FIG. 18 depicts an exemplary charging screen of the application in accordance with exemplary implementation of embodiments of the present invention.

After a successful login, the user may be presented with a home screen. Showing various information, logos, greetings, and messages. A tool bar may be present along the bottom, or any other visually accessible location, of the screen having navigation icons. FIG. 18 depicts an exemplary charging screen showing the tool bar and the icons. The icons may include an account button 108, a locations button 110, a power button 112 for exiting and/or deactivating the application, and a settings button 114.

Figure 19:
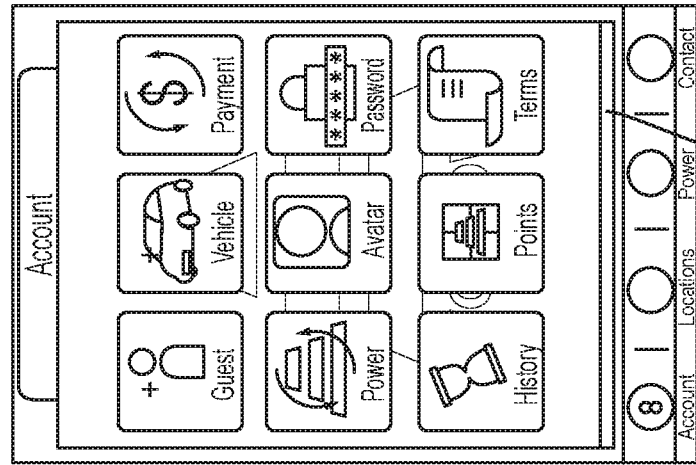
FIG. 19 depicts an exemplary account screen of the application in accordance with exemplary implementation of embodiments of the present invention.

The account button 108 can direct the user to the account home screen 116 as shown in FIG. 19. The account home screen 116 allows a user to add guests, add vehicles, change payment options, change power options, change their avatar, change their password, view their usage history, view acquired points (obtained through usage of the system), and view the Terms of Use.

Figure 20:
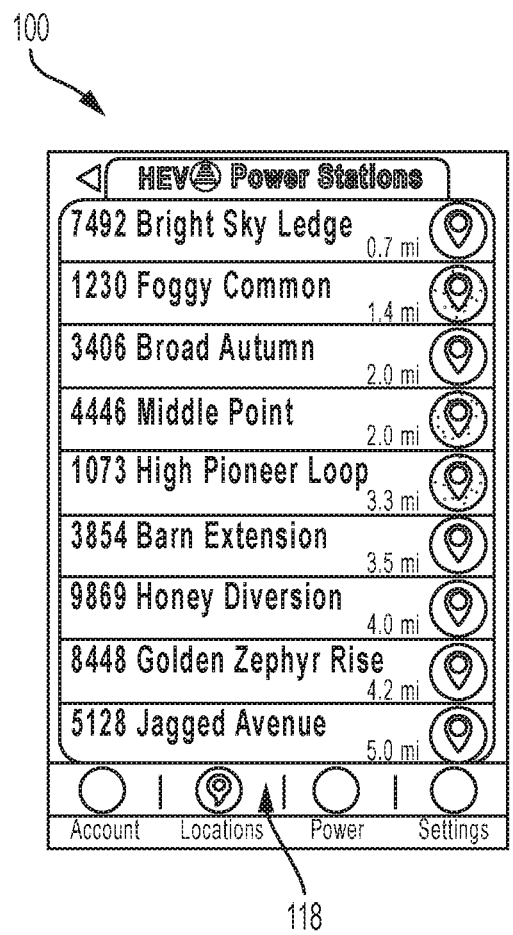
FIG. 20 depicts an exemplary location list screen of the application in accordance with exemplary implementation of embodiments of the present invention.

The user may also select the locations button 110 to access a location list 118 as depicted in FIG. 20. The location list 118 can display charging stations 10 in the area. The application 100 may use or receive information from a location service such as GPS or other cellular-site location system. The application 100 receives user positioning data and displays charging stations 10 ordered by location closest to the user. The user may also have the option to search other locations for charging stations 10, for example by address or zip code. The location list 118 also conveys to the user whether a particular charging station is vacant or occupied through visual indicia, for example different colored icons. The user may select a charging station 10 that is occupied and be given the option to receive a notification, for example by email or SMS, when the charging station 10 becomes vacant. When a desired location is found, the user may select the appropriate charging station 10. Information about the selected charging station 10 may then be displayed to the user.

Figure 21:
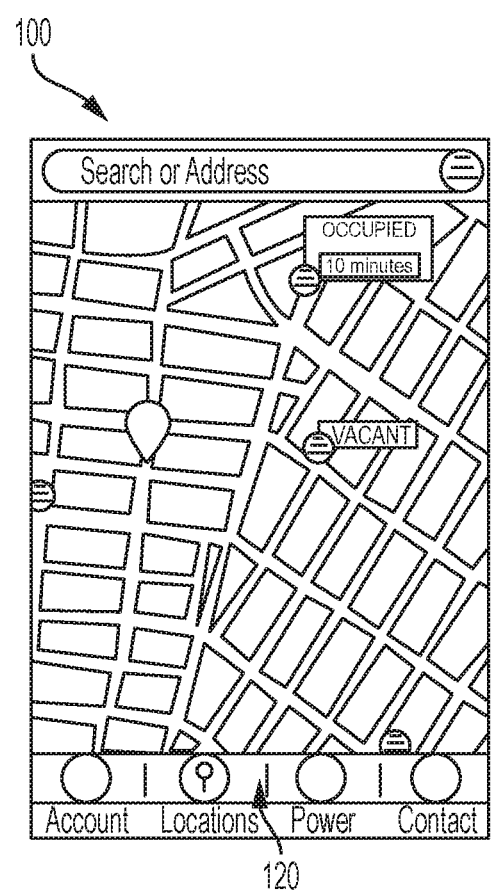
FIG. 21 depicts an exemplary map screen of the application in accordance with exemplary implementation of embodiments of the present invention.

In various exemplary embodiments, the application 100 utilizes an integrated or embedded geographic information system or mapping service 120 as shown in FIG. 21. An example of such a mapping service is Google Maps® or OpenStreetMap which may be integrated through an application programming interface. The mapping service 120 may be activated when a charging station 10 is selected from the location list 118, or may be independently accessed by the user through the application 100. The mapping service 120 can show the location of charging stations 10 relative to the user. The mapping service 120, along with other parts of the application 100, may display information relating to each charging station 10 viewed by the user. For example, the mapping service 120 may show whether charging stations 10 are occupied or vacant, the amount of time before an occupied charging station 10 is vacant, and the average wait time for a specific charging station 10.

When a charging station 10 is selected, the mapping service 120 may show a picture of the charging station 10 so that the user will be familiar with the location upon arrival. If desired by the user, the mapping service 120 provides directions from the user location to the selected charging station. The mapping service 120 may continually update to provide turn-by-turn directions to the user, guiding them to the selected charging station 10. The mapping service 120 may also provide information on points of interest in the area surrounding the charging station 10, including parks, museums, galleries, restaurants, shops, and bars.

In various exemplary embodiments, the user may reserve a charging station 10 ahead of time. Reservations may be made by selecting the charging station 10, for example from the location list 118 or from the mapping service 120. Reservations may be made in advance by a user for a specific time for each charging station 10 and stored in a database 42. The application 100 may then indicate to other users that the reserved charging station 10 is in use. Reservation information may be stored in a database 42 and accessed as needed. The application 100 may transmit reminders to a user of a stored reservation, for example by email or SMS. The user may cancel within a certain timeframe prior to their reservation. The application 100 may use location data received from a user or a vehicle 12 to determine if the vehicle is in or near the appropriate charging station 10 at the reserved time. If not, the application 100 may cancel the reservation or transmit an additional reminder or a reservation confirmation message to a user. If the user fails to respond to the messages or responds that they wish to cancel the reservation, the reservation is canceled and the charging station 10 is listed as vacant. Various penalties, including a cancellation fee may be applied to a user's account for missing a reservation.

As the user approaches the charging station 10, the position of the vehicle 12 may be detected by the charging station 10 and a parking sequence 122 may be initiated by the application 100 to assist the user with aligning the vehicles receiver 22 with the charging unit 20. Improper alignment can lead to less power transfer and inefficient charging. The presence and position of the vehicle 12 may be detected by the charging station 10 sensors 30, by positioning and location data received by the application 100, or by any combination thereof. In various exemplary embodiments, the application 100 is designed to communicate with the remote server 36, the charging station 10, and/or the vehicle 12 to send and receive information regarding positioning.

Figure 22:
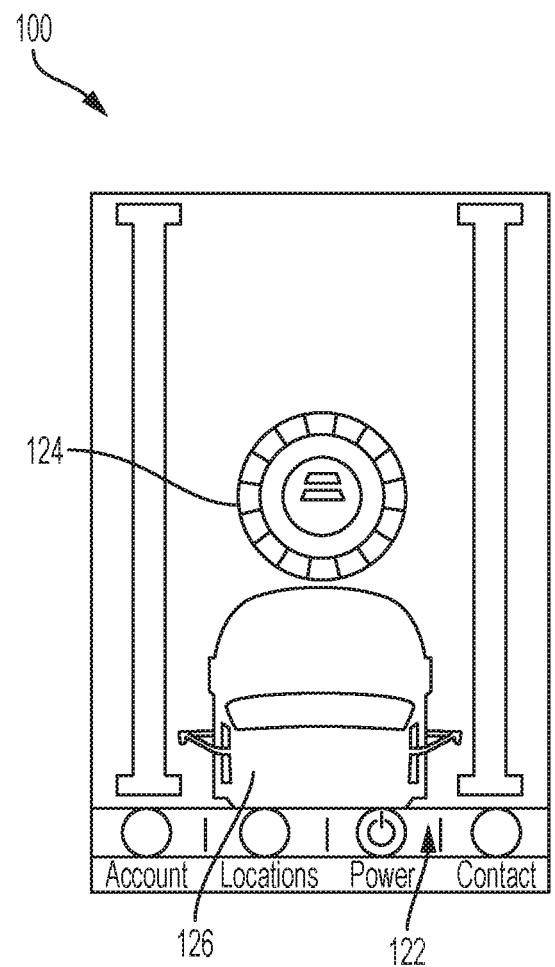
FIG. 22 depicts an exemplary parking sequence screen of the application in accordance with exemplary implementation of embodiments of the present invention.
Figure 23:
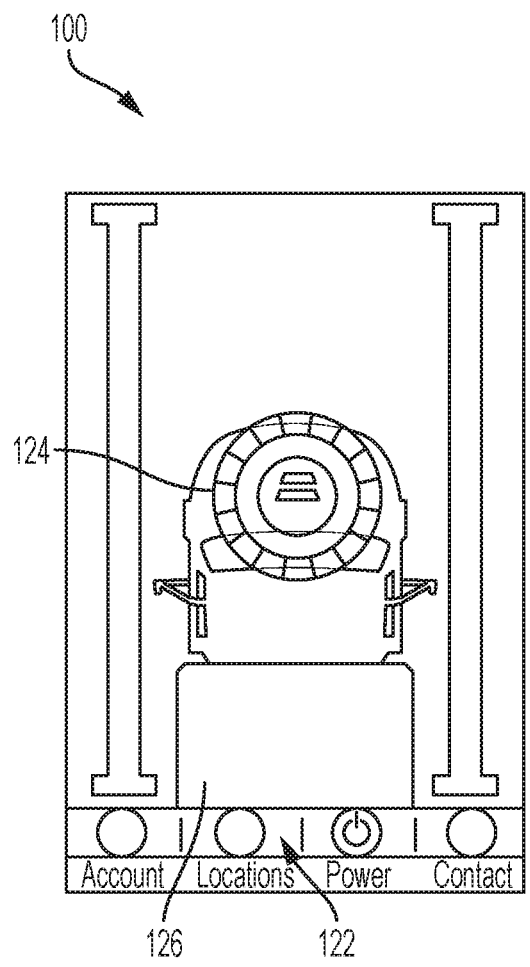
FIG. 23 depicts another exemplary parking sequence screen of the application in accordance with exemplary implementation of embodiments of the present invention.
Figure 24:
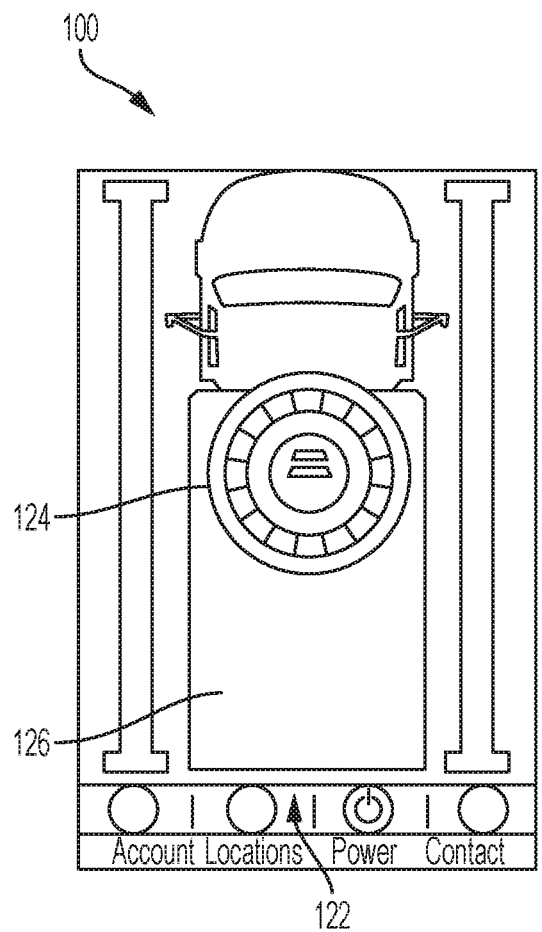
FIG. 24 depicts another exemplary parking sequence screen of the application in accordance with exemplary implementation of embodiments of the present invention.
Figure 25:
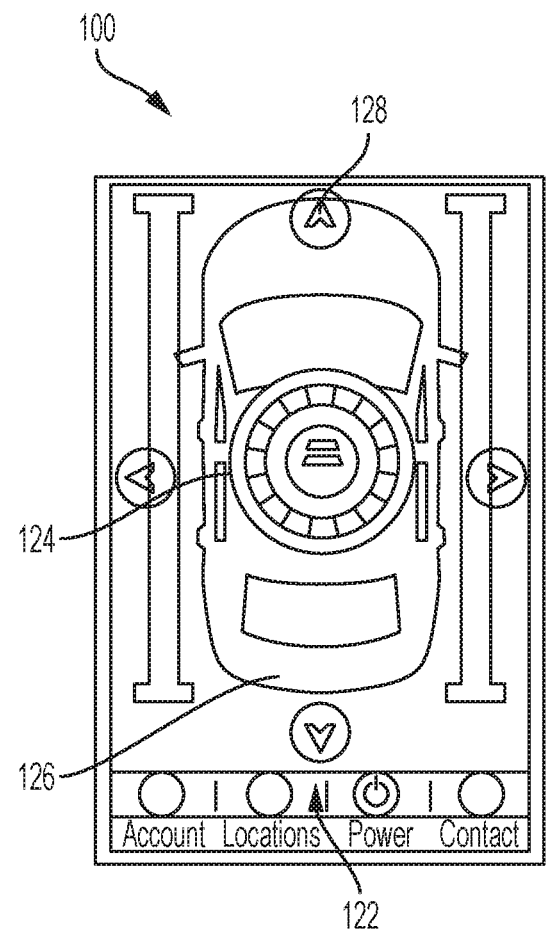
FIG. 25 depicts another exemplary parking sequence screen of the application in accordance with exemplary implementation of embodiments of the present invention.
Figure 26:
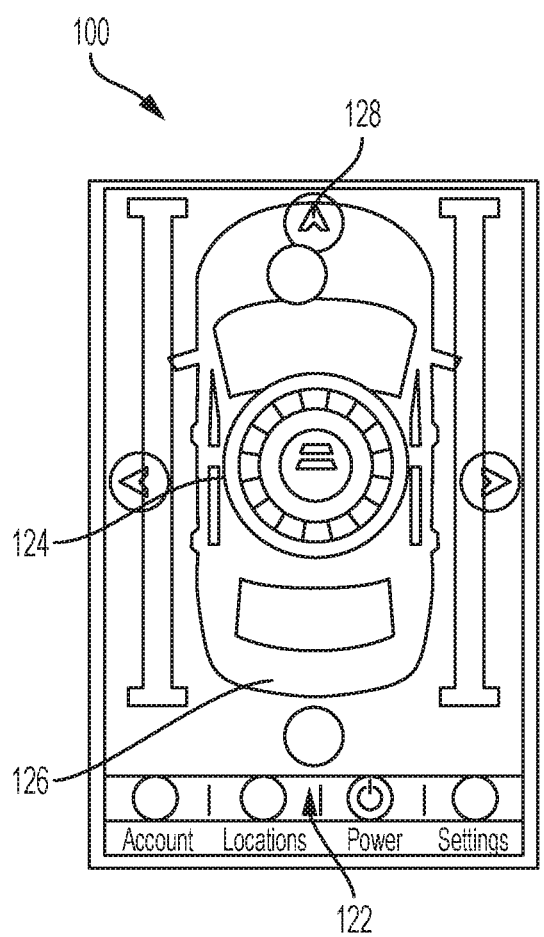
FIG. 26 depicts another exemplary parking sequence screen of the application in accordance with exemplary implementation of embodiments of the present invention.

As best shown in FIGS. 22-26, the parking sequence 122 displays a charging unit icon 124 and a vehicle icon 126. The parking sequence may also include directional arrows 128 indicating which direction the vehicle needs to go to align with the charging unit 20. The application 100 may provide a visual signal to the user when the vehicle 12 is properly aligned. For example, the charging unit icon 124 and/or the vehicle unit icon 126 may have an initial color as the vehicle 12 initially approaches the charging station 10 as shown in FIG. 22. For example, the icons 124, 126 may be red. The charging unit icon 124 and/or the vehicle unit icon 126 may brighten or change color as the vehicle approaches alignment as best shown in FIG. 23. For example, the icons 124, 126 may be yellow. The charging unit icon 124 and/or the vehicle unit icon 126 may finally brighten or change color when the vehicle 12 is properly aligned with the charging unit 20 as shown in FIGS. 24 and 25. For example, the charging unit icon 124 may turn green and the vehicle unit icon 126 may turn blue. The application 100 may provide one or more audio signals to alert the user that the vehicle is in the initial, intermediate, and final alignment stages, either in connection with the visual signals or in place of the visual signals. The parking sequence 122 may also alert a user when they have gone past a proper alignment as best shown in FIG. 26.

The charging stations 10 in the network may have an identical layout as to the position of the charging unit 20 and the receivers 22 of each vehicle 12 may be placed in a uniform position relative to, for example, the front of the car. In this way, the parking sequence 122 may perform a relatively uniform determination for all parking sequences 122. In alternative embodiments, however, the charging units 20 and/or the receivers 22 may have non-uniform placement. The charging unit 10 and application 100 may communicate, either directly or through the remote server 36 to assist in properly aligning the vehicle 12. The charging station 10 may be capable of recognizing the placement of each individual vehicle receiver 22, for example by a specific vehicle 12 or receiver 22 identifier that is transmitted to the charging station. The transmission may be through, a radio transmission, WiFi, or Bluetooth or through a form of inductance communication at a specific frequency between the receiver 22 and the charging unit 20. The charging station 10 may also supply charging unit 20 position data to the application 100, either directly or through the remote server 36. The application may compare this data to stored data representing the receiver position 22 to facilitate proper alignment. The data representing the receiver position 22 may be entered or selected by a user, or it may be transmitted by the receiver 22 or another component of the vehicle 12 to the application 100.

Figure 27:
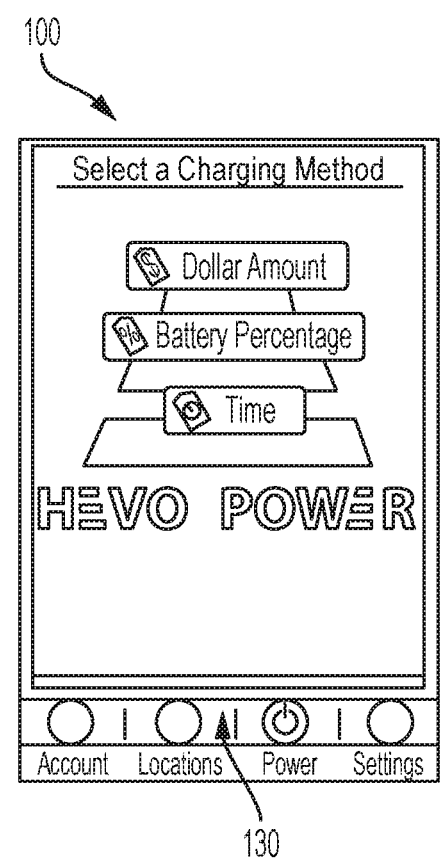
FIG. 27 depicts an exemplary charging method screen of the application in accordance with exemplary implementation of embodiments of the present invention.
Figures 28, 29:
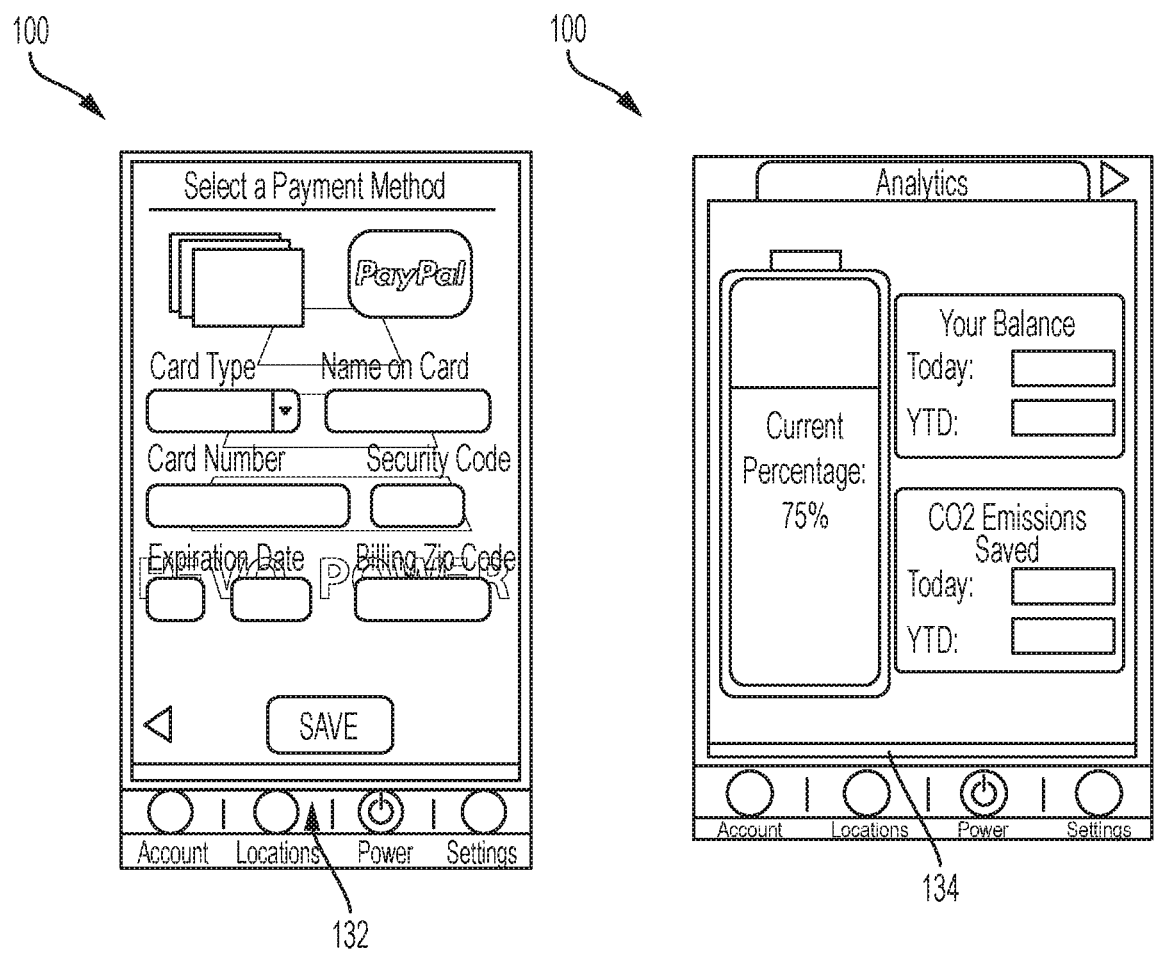
FIG. 28 depicts an exemplary payment screen of the application in accordance with exemplary implementation of embodiments of the present invention.
FIG. 29 depicts an exemplary analytics screen of the application in accordance with exemplary implementation of embodiments of the present invention.

After a vehicle 12 is properly aligned with the charging unit 20, a charging method screen 130 may be selected or automatically displayed to the user. An example of a charging method screen 130 is depicted in FIG. 27. The user may select a default option that was established at registration or through the account home screen 116. The user may also select to charge their car based on a dollar amount, up to a certain battery percentage, or for a certain amount of time. After the user is finished at the charging station 10, they may be automatically billed for the amount of charging performed or they may be directed to a payment screen 132, as shown in the example of FIG. 28, where a user may select various payment methods. The user may also select the method of payment after selecting the charging method. In certain locations, users may also be billed for parking fees. While charging, the application 100 may show a charging screen 104. As shown in the example of FIG. 18, the charging screen 104 provides a battery indicator 106 representing an approximation of the electrical vehicles charge. This information may be received directly from the vehicle, for example via a Bluetooth® connection.

As shown in the example of FIG. 29, the user may navigate to an analytic screen 134. This screen may show different statistics to the user. For example, the analytic screen 134 may display the vehicle's current battery percentage, the amount of money being spent on charging, and the amount of $CO_2$ emissions saved based on travel distance. The statics may also include the rate of charging and charging efficiency while at a charging station 10. Various other monitoring information, alerts, and messages, such as a charging error alert, may be sent to user during charging. These communications may be sent through the remote server 36 or directly to the user device 38. Various other statics may also be selected.

Figure 30:
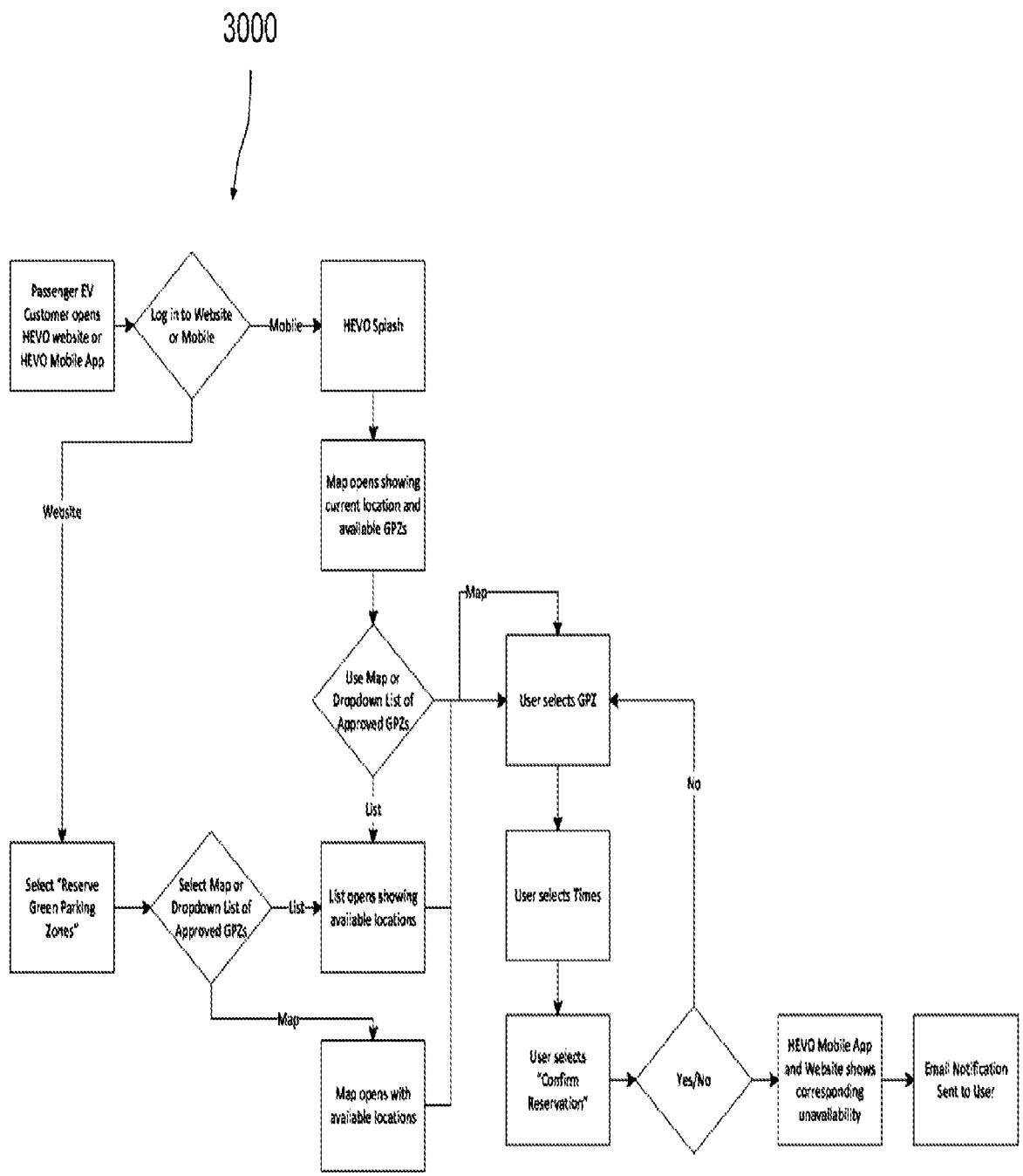
FIG. 30 is a diagram illustrating an example of a reservation process in accordance with exemplary implementation of embodiments of the present invention.

FIG. 30 depicts and exemplary system and method for a reservation process 3000 allowing a user to locate and reserve a charging station 10, for example in a designated "Green Parking Zone". The term "Green Parking Zone" (GPZ) is used herein simply as a non-limiting reference label for consistency of description and to facilitate understanding of exemplary implementations. The reservation process 3000 may utilize any combination of the administrator system 40, database 42, and other components described herein. A user access the application 100 or a website and enters login information. Accessing the system may bring a user to a map showing GPZ locations or dropdown list of GPZ locations. A user selects a specific location and may be presented with available times. A user then selects a time and can be given the option to confirm the reservation. After the reservation is confirmed, it may be stored and an email notification may be sent to the user.

Figure 31:
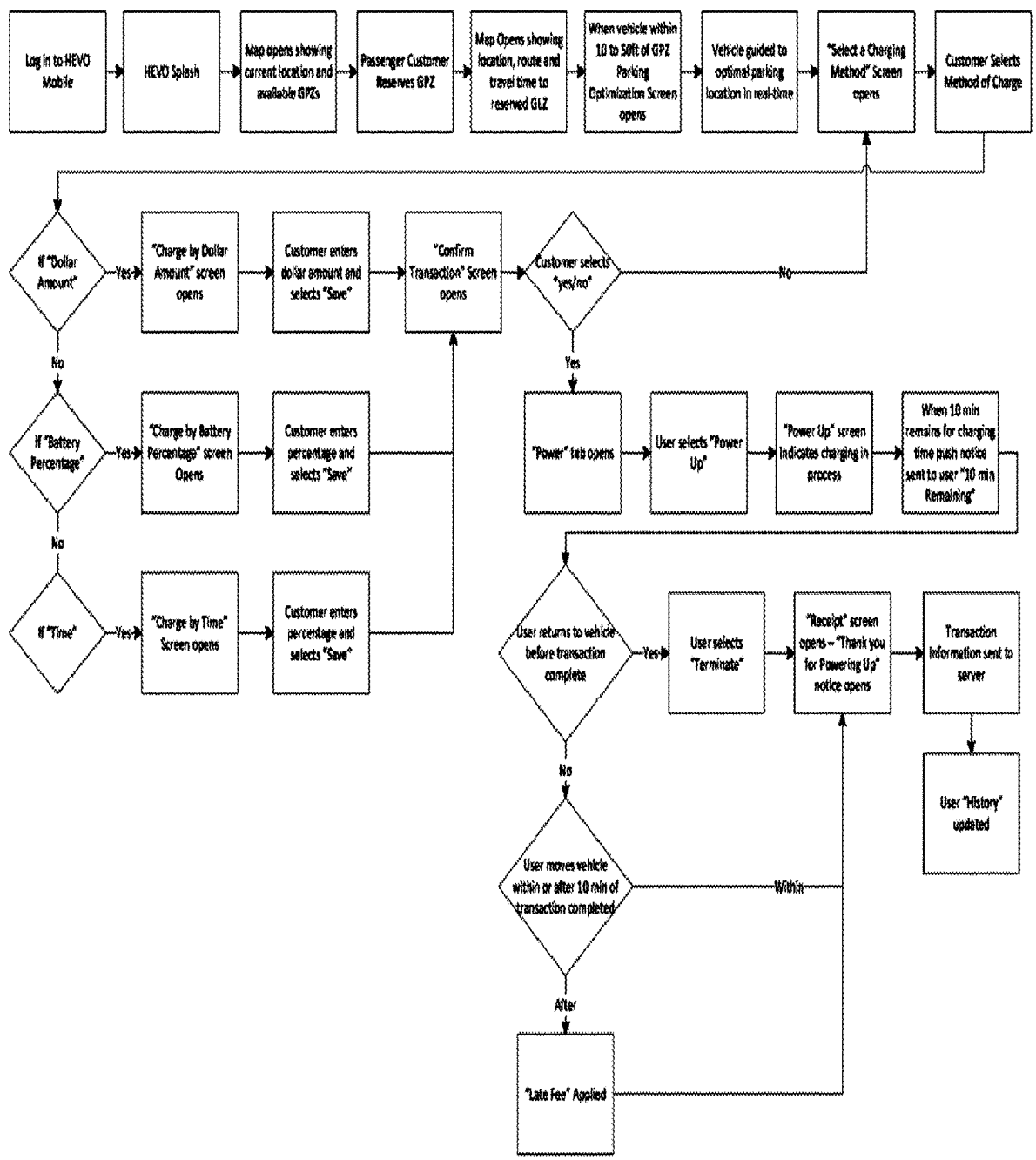
FIG. 31 is a diagram illustrating an example of a use process in accordance with exemplary implementation of embodiments of the present invention.
Figure 33:
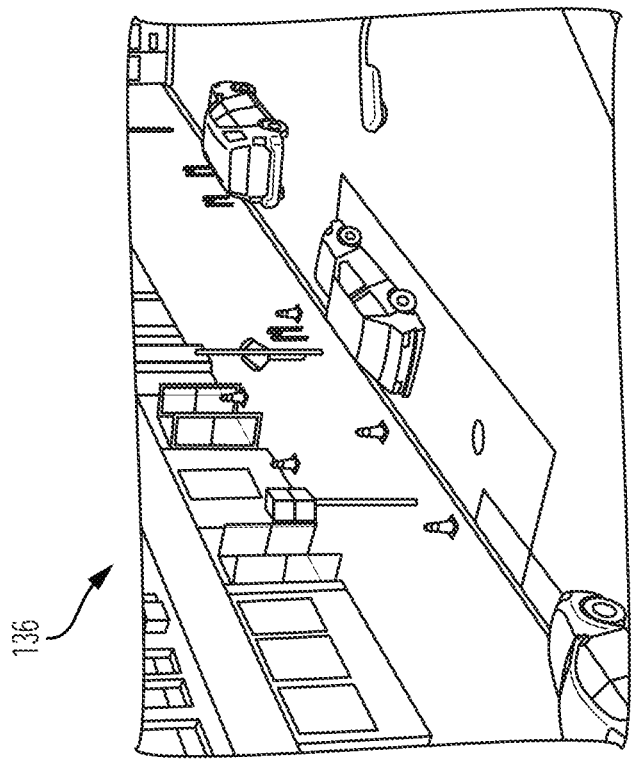
FIG. 33 is another illustration of a general view of a charging zone in accordance with exemplary implementation of embodiments of the present invention.
Figure 32:
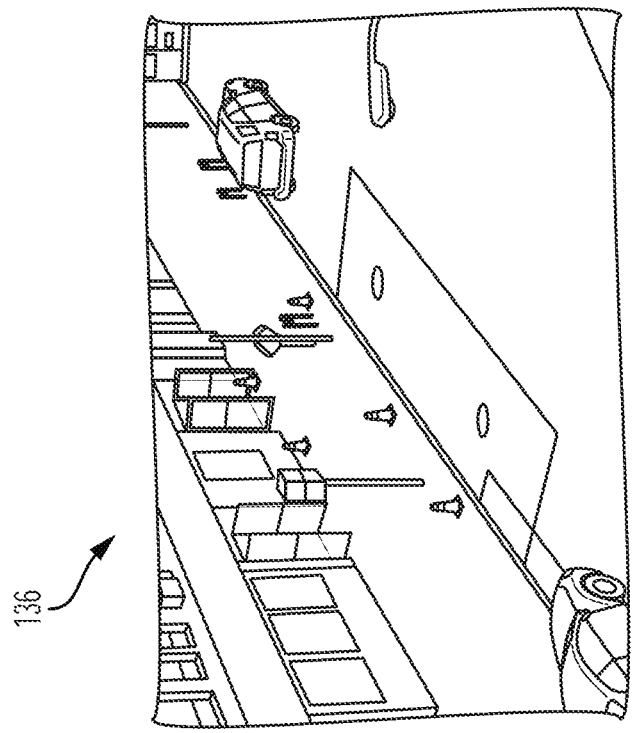
FIG. 32 depicts a general view of a charging zone in accordance with exemplary implementation of embodiments of the present invention.

FIG. 31 depicts an exemplary process 3100 describing the system and method for utilizing the charging stations 10 and application 100 described herein. A user logs into the system through the application 100 or a website. The user is provided with a map showing the current locations and available GPZs. The user selects a location and may be given the option to reserve a charging station 10. A map opens showing the location, route and travel time to the reserved GPZ. When the vehicle 12 is within a certain distance, for example in the range of approximately 10 to 50 feet, the parking sequence 122 is initiated and displayed to the user guiding the user to the optimal parking position in real time. The user is then given the option to choose a charging method, for example the charging screen 130. Depending on the charging method selected, the user is provided with an appropriate screen. For example, if the user selects charging by a certain dollar amount, they may be provided with a screen that allows them to enter a desired dollar amount. If the user selects a battery percentage, they may be provided with a screen that allows them to enter a desired percentage for charging. If the user selects an amount of time, they may be provided with a screen that allows them to enter a desired amount of time. After the user confirms their selects they may be provided with a screen that allows them to initiate charging. In various exemplary embodiments, the user must initiate charging within a set amount of time or the screen will time-out.

Regardless of the charging method selected, the system, for example the administrator system 40, may be capable of determining an approximate time when charging will be complete. When battery percentage is selected, the system may make this calculation on information received from the battery management system 25 and information related to the charging rate and efficiency. This calculation may be performed at specific intervals and updated as needed. The user may be provided with messages or alerts informing them of when their charging will be complete. In an exemplary embodiment, when approximately 10 minutes is remaining, a message may be sent to the user. When the user returns to their vehicle 12 they may select to terminate the charging and leave the GPZ. A receipt screen is shown after the charging is terminated, a copy of which may be sent to the user, for example by email. Information of the transaction may be sent to the remote server 36. If the user does not move their vehicle 12 within the set amount of time, the user may be charged a late fee. This encourages turn-over and assists in providing proper scheduling and information to additional users.

In various exemplary embodiments, the application 100 may provide additional communications to the user based on geo-location and system usage data. For example, user location, charging station 10 usage, and reserved charging station 10 location data may trigger various communications to the user. These communications may be displayed through the application 100 or push notifications that are sent to the user, for example by email or SMS message. The communication may transmit advertisements or coupons to a user.

Various exemplary embodiments are directed to a system which implements "Green Loading Zones" (GLZs) 136. The term "Green Loading Zones" (GLZs) is used herein simply as a non-limiting reference label for consistency of description and to facilitate understanding of exemplary implementations. GLZs 136 provide wireless charging and parking in public areas for an established rate to all registered vehicles. This allows commercial fleet operators to charge their vehicles while loading and unloading payloads, thus, streamlining deliveries and work schedules. GLZs 136 can address, for example, the problem of range limitation that commercial fleets face by strategically positioning and installing charging stations 10 at GLZs 136, loading facilities, and company-owned parking lots. GLZs 136 can provide commercial fleet operators the opportunity to optimize fleet logistics and make the adoption of electric trucks cost-effective, efficient, and practical. GLZs 136 may also enable secondary vehicle systems, such as climate control systems to move from gas or diesel power to electric.

Figure 34:
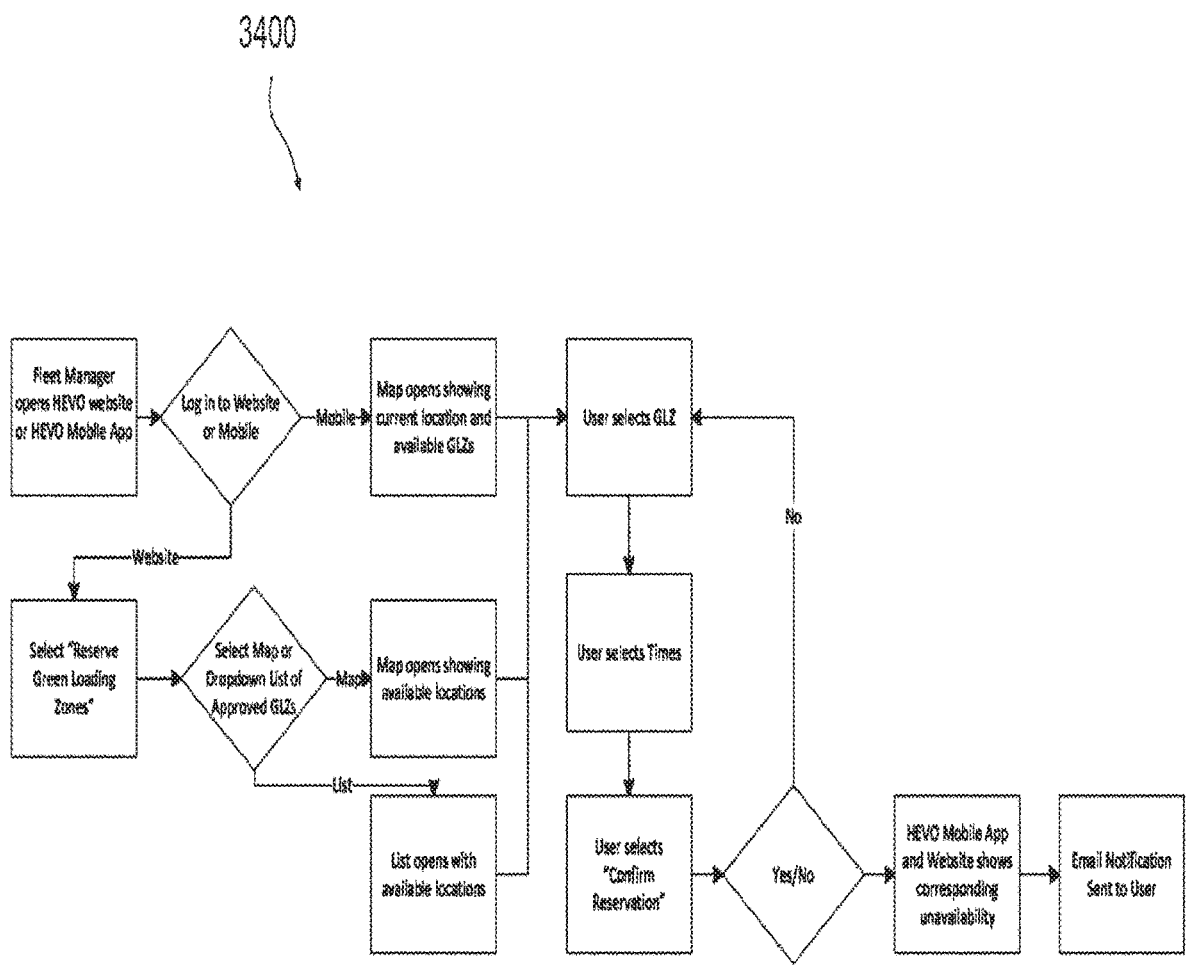
FIG. 34 is a diagram illustrating an example of a reservation process in accordance with exemplary implementation of embodiments of the present invention.

GLZs 136 may be implemented by the application 100 and the remote server 36. A dedicated database 42 may compile and log information relating to the GLZs 136, for example scheduling and usage information. A company may schedule a delivery ahead of time and reserve a particular charging station 10. A company may also have a dedicated daily/weekly/monthly time window for utilizing a GLZ 136. Scheduling and reservation of certain GLZs 136 may be optimized to increase delivery efficiency, reducing not only emissions, but congestion and gridlock caused by multiple delivery trucks or other commercial vehicles attempting to occupy and utilize a limited space. FIG. 34 depicts and exemplary system and method for a GLZ reservation process 3400 allowing a user to locate and reserve GLZs. The GPZs or GLZs 136 may also be reserved or utilized to provide power to construction crews, emergency services such as lighting and command center, and other official vehicles and devices that typically need to be run off of generators or connected to light posts for operation. If an occupied charging station 10 is needed on an emergency basis, an alert may be sent to a user informing them of the need to remove their vehicle immediately or a notice that the vehicle has been towed or relocated.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the precise embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

Further, exemplary implementations of above-described exemplary embodiments may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and so on, including a carrier wave transmitting signals specifying the program instructions, data structures, and so on. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Only those claims which use the words "means for" are to be interpreted under 35 U.S.C. 112, sixth paragraph.

What is claimed:

1. A wireless charging station comprising:
   a charging unit configured to wirelessly transfer power to a receiver in a vehicle;
   a control module communicatively coupled to the charging unit and configured to activate the charging unit to wirelessly transfer the power to the vehicle when the receiver is determined to be aligned with the charging unit;

a communication unit communicatively coupled to the control module and configured to communicate an alignment data with one or more devices associated with the vehicle for displaying a visual indicator to facilitate moving the vehicle such that the receiver of the vehicle is aligned with the charging unit; and a housing body housing the charging unit and the control module, the housing body having a conduit therethrough in which a communication medium is positionable for communicatively coupling the charging unit and the control module to a utility line, the housing body comprising a mounting bezel and a removable cover coupled to the mounting bezel, wherein the charging unit is enclosed within the housing body by the removable cover of the housing body and secured to the mounting bezel such that the charging unit is immovable relative to the receiver of the vehicle.

2. The wireless charging station of claim 1, wherein the housing body is configured to be positioned beneath the vehicle, wherein the charging unit is configured to be positioned under a street, wherein the removable cover of the housing body is configured to be underneath or flush with the surface of the street.

3. The wireless charging station of claim 1, wherein the housing body is configured to be positioned beneath the vehicle, wherein the charging unit is configured to be positioned at least partially above a street, wherein the removable cover of the housing body is configured to extend above the street.

4. The wireless charging station of claim 1, wherein the housing body is configured to be positioned above the vehicle, wherein the charging unit is configured to be suspended above the vehicle.

5. The wireless charging station of claim 1, wherein the alignment data comprises a relative position between the receiver and the charging unit based on measurements from at least one of a proximity sensor, a pressure sensor, or a global positioning system sensor positioned in an inner area of the housing body, wherein the visual indicator includes a vehicle icon and a charging unit icon illustrating the position of the receiver and the position of the charging unit relative to each other, wherein the visual indicator changes colors based on an alignment of the charging unit and the receiver, wherein the visual indicator is displayed on a user interface that includes an alert indicating alignment.

6. The wireless charging station of claim 1, further comprising:
at least one sensor configured to determine a position of the receiver; and
a meter configured to determine an amount of power transferred by the charging unit.

7. The wireless charging station of claim 1, further comprising an inverter and a rectifier positioned external of the housing body, wherein the charging unit comprises an electromagnetic resonance charger.

8. A wireless charging system comprising:
a charging station including:
a charging unit configured to wirelessly transfer power to a receiver in a vehicle;
a control module communicatively coupled to the charging unit and configured to activate the charging unit to transfer the power to the vehicle wirelessly in response to determining the receiver is aligned with the charging unit;

a communication unit communicatively coupled to the control module and configured to communicate information including an alignment data with a server; and a housing body for housing the charging unit and the control module, wherein the housing body includes a mounting bezel and a removable cover coupled to the mounting bezel, the removable cover at least partially enclosing the control module within the housing body such that the control module is accessible through the removable cover, where the charging unit is fixedly coupled to the mounting bezel such that the charging unit is immovable relative to the housing body; and the server communicatively coupled to the charging station and configured to maintain an application that is configured to be accessible through one or more devices and to communicate the information regarding the charging station to the one or more devices, the alignment data being provided to the one or more devices and displayable via a user interface of the one or more devices for providing a visual indicator to facilitate moving the vehicle such that the receiver is aligned with the charging unit, the visual indicator including a vehicle icon and a charging unit icon to illustrate the position of the receiver relative to the position of the charging unit, the charging unit icon capable of overlapping with the vehicle icon, the user interface including an alert for indicating an alignment of the charging unit and the receiver.

9. The wireless charging system of claim 8, wherein the housing body is configured to be positioned beneath the vehicle, the housing body having a conduit therethrough in which a communication medium is positionable for communicatively coupling the charging unit and the control module to a utility line, wherein the charging unit is configured to be positioned under a street.

10. The wireless charging system of claim 8, wherein the housing body is configured to be positioned beneath the vehicle, wherein the charging unit is configured to be positioned at least partially above a street, wherein the removable cover of the housing body is configured to extend above the street.

11. The wireless charging system of claim 8, wherein the housing body is configured to be positioned above the vehicle, wherein the charging unit is configured to be suspended above the vehicle.

12. The wireless charging system of claim 8, further comprising:
one or more sensors communicatively coupled to the charging station and configured to determine a positional data indicating the vehicle's location relative to the charging unit, the one or more sensors including at least one of a proximity sensor, a pressure sensor, or a global positioning system sensor positioned in an inner area of the housing body; and
a meter configured to determine an amount of power transferred by the charging unit.

13. The wireless charging system of claim 8, wherein the application is further configured to initiate a parking sequence function in response to the vehicle being within a threshold distance of the charging station, wherein the application receives a vehicle location data from the one or more devices, a positional data from the sensors, and the parking sequence function includes comparing the vehicle location data with the positional data.

14. The wireless charging system of claim 13, wherein the parking sequence function is configured to provide the user interface with instructions to:

display the vehicle icon and the charging unit icon,
change colors of the visual indicator based on the alignment of the charging unit and the receiver, and
provide an alert in response to the vehicle moving such that the receiver is in alignment with the charging unit,
wherein the application comprises a payment function to be displayed via the user interface that facilitates paying for an amount of power transferred by the charging unit.

15. A method of wirelessly charging a vehicle comprising:
transmitting information about one or more charging stations to a device associated with a vehicle;
receiving from the device a request to charge the vehicle at a specific charging station from the one or more charging stations;
identifying when the vehicle is proximate the specific charging station;
providing an alignment data to a second device associated with the vehicle that displays a visual indicator to facilitate moving the vehicle such that a receiver in the vehicle is aligned with a charging unit positioned in a housing body of the specific charging station, the housing body comprising a mounting bezel that fixedly couples a charging unit to the housing body such that the charging unit is immovable, and a removable cover covering the mounting bezel and having an aperture for receiving a control module in the housing body such that the control module is accessible through the removable cover; and
activating the charging unit in the specific charging station to transmit power to the receiver in the vehicle from a utility line communicatively coupled to the charging unit by a communication medium positioned in a conduit of the housing body.

16. The method of claim 15, wherein providing the alignment data to the second device associated with the vehicle comprises providing a positional information regarding the charging unit that is positioned under a street beneath the vehicle, wherein the removable cover of the housing body is configured to be underneath a driving surface of the street.

17. The method of claim 15, wherein providing the alignment data to the second device associated with the vehicle comprises providing a positional information regarding the charging unit that is positioned at least partially above a street, wherein the removable cover of the housing body is configured to extend above a driving surface of the street.

18. The method of claim 15, wherein providing the alignment data to the second device associated with the vehicle comprises providing a positional information regarding the charging unit that is positioned above the vehicle.

19. The method of claim 15, wherein providing the alignment data to the second device associated with the vehicle comprises:
receiving a positional information indicating a position of the receiver with respect to the charging unit from at least one of a proximity sensor, a pressure sensor, or a GPS sensor positioned in an inner area of the housing body;
displaying the positional information on a user interface as a vehicle icon that illustrates the position of the receiver and a charging unit icon that illustrates a position of the charging unit relative to the position of the receiver, the charging unit icon capable of overlapping with the vehicle icon, the user interface including an alert for indicating alignment; and
transmitting the positional information to the charging unit.

20. The method of claim 15, wherein the first device and the second device are the same device.

* * * * *